(12) United States Patent
Palmer et al.

(10) Patent No.: US 6,823,923 B2
(45) Date of Patent: Nov. 30, 2004

(54) LIGHT-CONTROL WINDOW COVERING AND METHOD AND APPARATUS FOR ITS MANUFACTURE

(75) Inventors: Roger C. Palmer, Greensboro, NC (US); Warren Stephenson, West Greenwich, RI (US)

(73) Assignee: Hunter Douglas Inc., Upper Saddle River, NJ (US)

( * ) Notice: Subject to any disclaimer, the term of this patent is extended or adjusted under 35 U.S.C. 154(b) by 56 days.

(21) Appl. No.: 10/102,194

(22) Filed: Mar. 20, 2002

(65) Prior Publication Data

US 2003/0029577 A1 Feb. 13, 2003

Related U.S. Application Data

(63) Continuation-in-part of application No. 09/549,969, filed on Apr. 14, 2000, now Pat. No. 6,484,786.

(51) Int. Cl.⁷ .............................................. E06B 9/06
(52) U.S. Cl. .................................................. 160/84.05
(58) Field of Search .......................... 160/84.05, 84.04; 428/116; 156/73.1

(56) References Cited

U.S. PATENT DOCUMENTS

| 2,056,823 | A | 10/1936 | Brown |
|---|---|---|---|
| 2,110,145 | A | 3/1938 | Loehr |
| 2,140,049 | A | 12/1938 | Grauel |
| 2,267,869 | A | 12/1941 | Loehr |
| 2,856,324 | A | 10/1958 | Janowski |
| 2,865,446 | A | 12/1958 | Cole |
| 2,914,122 | A | 11/1959 | Pinto |
| 2,994,370 | A | 8/1961 | Pinto |
| 3,032,099 | A | 5/1962 | Croxen |
| 3,111,163 | A | 11/1963 | Nelson |
| 3,141,497 | A | 7/1964 | Griesser |
| 3,170,505 | A | 2/1965 | Lorentzen et al. |
| 3,299,943 | A | 1/1967 | Poe |
| 3,384,519 | A | * | 5/1968 | Froget .......................... 156/65 |
| 3,540,975 | A | 11/1970 | Wright et al. |

(List continued on next page.)

FOREIGN PATENT DOCUMENTS

| CA | 2090046 | 8/1994 |
|---|---|---|
| DE | 1 942 674 | 3/1970 |
| DE | 27 35 654 A1 | 2/1979 |
| DE | 3 041 983 A1 | 9/1982 |
| DE | 3 525 515 A1 | 1/1987 |
| EP | 0 482 793 A1 | 4/1992 |
| EP | 0 688 935 A1 | 12/1995 |
| FR | 1309194 | 10/1962 |
| FR | 1364674 | 5/1964 |
| FR | 1381472 | 11/1964 |
| FR | 1465261 | 11/1966 |
| FR | 423 207 | 4/1967 |
| FR | 1521488 | 3/1968 |
| FR | 1585159 | 1/1970 |
| FR | 494 338 | 11/1970 |

(List continued on next page.)

Primary Examiner—Blair M. Johnson
(74) Attorney, Agent, or Firm—Dorsey & Whitney LLP

(57) ABSTRACT

A light-control window covering includes a first sheet of sheer material and a second sheet of sheer material spaced apart from the first sheer sheet of material. A plurality of vanes having a first face and a second face, a center region and a first and a second longitudinal margin. The vanes include perforations proximate the first and second longitudinal margins. A plurality of thermoplastic ribbons are welded to the first and second sheets of sheer material and the vanes to provide a stronger weld between the sheer materials and the vanes.

19 Claims, 25 Drawing Sheets

U.S. PATENT DOCUMENTS

| | | |
|---|---|---|
| 3,661,665 A | 5/1972 | Froget |
| 3,701,376 A | 10/1972 | Froget |
| 3,844,330 A | 10/1974 | Hyman |
| 3,851,699 A | 12/1974 | Shapiro |
| 3,860,056 A | 1/1975 | Bruneau |
| 3,916,973 A | 11/1975 | Schuppler et al. |
| 3,946,789 A | 3/1976 | Ronkholz-Tolle, nee Tolle |
| 4,019,554 A | 4/1977 | Rasmussen |
| 4,039,019 A | 8/1977 | Hopper |
| 4,194,550 A | 3/1980 | Hopper |
| RE30,254 E | 4/1980 | Rasmussen |
| 4,386,454 A | 6/1983 | Hopper |
| 4,535,828 A | 8/1985 | Brockhaus |
| 4,858,668 A | 8/1989 | Toti |
| 4,884,612 A | 12/1989 | Schnebly et al. |
| 4,928,369 A | 5/1990 | Schnebly et al. |
| 4,984,617 A | 1/1991 | Corey |
| 5,012,552 A | 5/1991 | Wulf |
| 5,228,936 A | 7/1993 | Goodhue |
| 5,287,908 A | 2/1994 | Hoffmann et al. |
| 5,313,999 A | 5/1994 | Colson et al. |
| 5,320,154 A | 6/1994 | Colson et al. |
| 5,339,882 A | 8/1994 | Judkins |
| 5,339,883 A | 8/1994 | Colson et al. |
| 5,419,385 A | 5/1995 | Vogel et al. |
| 5,490,553 A | 2/1996 | Colson et al. |
| 5,638,880 A | 6/1997 | Colson et al. |
| 5,664,613 A | 9/1997 | Jelic |
| 5,718,799 A | 2/1998 | Colson et al. |
| 5,845,690 A | 12/1998 | Colson et al. |
| 5,846,360 A | 12/1998 | Gil |
| 5,879,493 A * | 3/1999 | Johnson et al. ............ 156/73.3 |
| 5,885,409 A | 3/1999 | Gil |
| 5,888,639 A | 3/1999 | Green et al. |
| 5,891,208 A | 4/1999 | Gil |
| 5,897,731 A * | 4/1999 | Colson et al. ............... 156/197 |
| 6,001,199 A | 12/1999 | Colson et al. |
| 6,112,797 A | 9/2000 | Colson et al. |
| 6,152,068 A | 11/2000 | Colson et al. |
| 6,196,291 B1 | 3/2001 | Rupel et al. |
| 6,299,115 B1 | 10/2001 | Kovach et al. |
| 6,302,982 B1 | 10/2001 | Corey et al. |
| 6,484,786 B1 * | 11/2002 | Ruggles et al. ........... 160/84.05 |
| 2002/0079063 A1 * | 6/2002 | Sheward .................. 160/84.04 |

FOREIGN PATENT DOCUMENTS

| | | |
|---|---|---|
| GB | 756270 | 9/1956 |
| GB | 1036126 | 7/1966 |
| GB | 1228677 | 4/1971 |
| GB | 1494842 | 12/1977 |
| GB | 1586801 | 3/1981 |
| JP | 51136344 | 12/1977 |
| NL | 7805464 | 10/1979 |
| WO | WO-80/02712 | 12/1980 |
| WO | WO-91/06237 | 5/1991 |

* cited by examiner

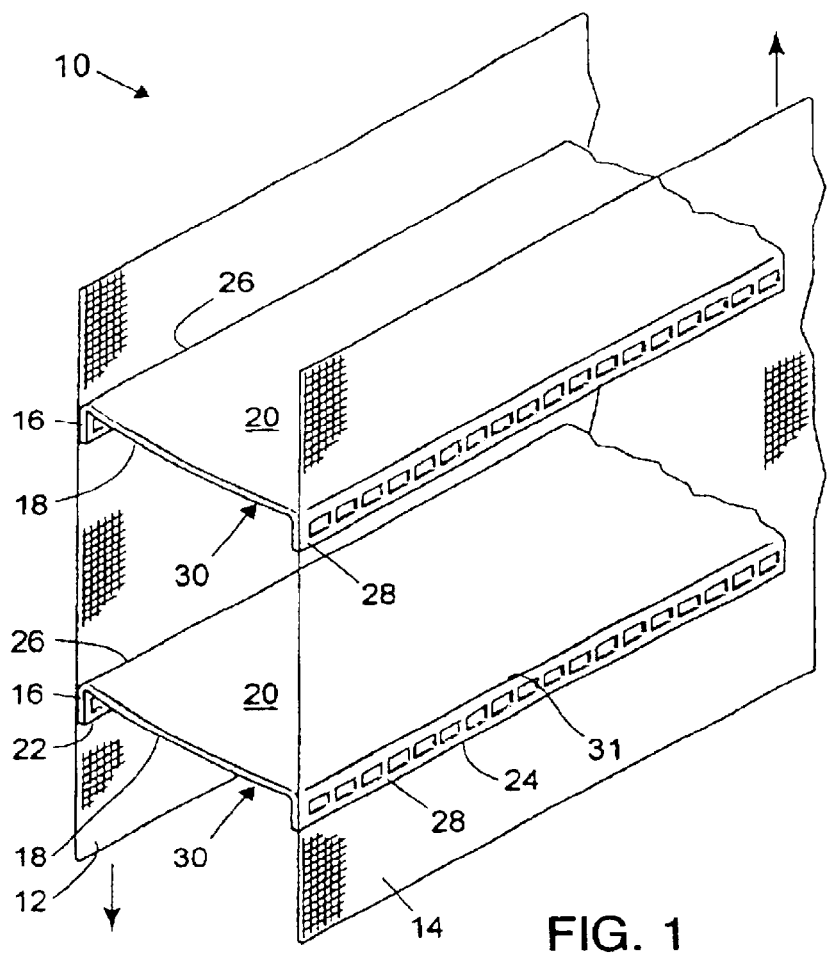
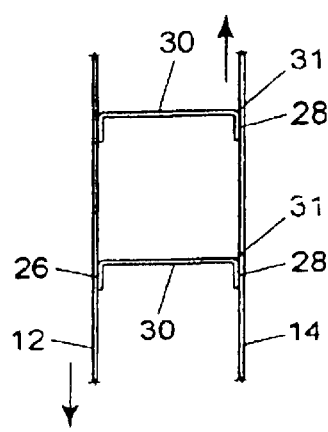 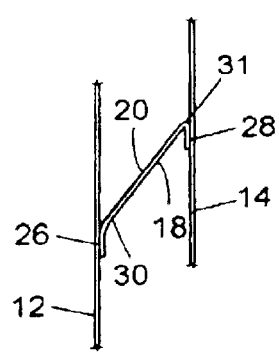 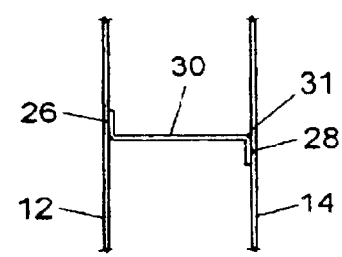
FIG. 1
FIG. 2A    FIG. 2B    FIG. 2C

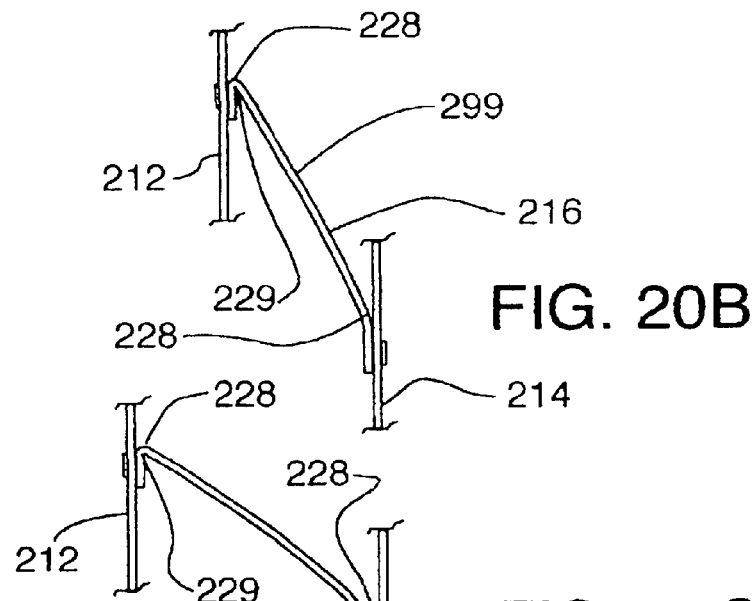
FIG. 20B
FIG. 20C
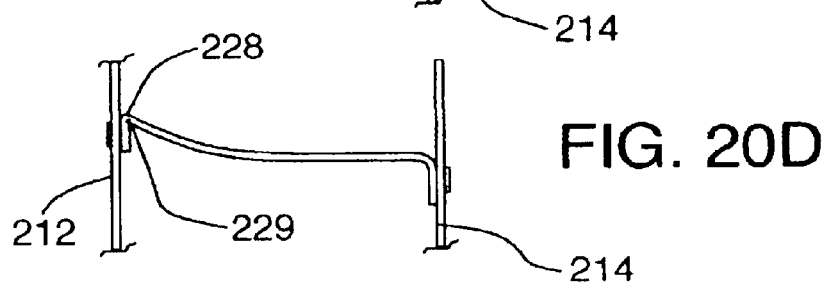
FIG. 20D
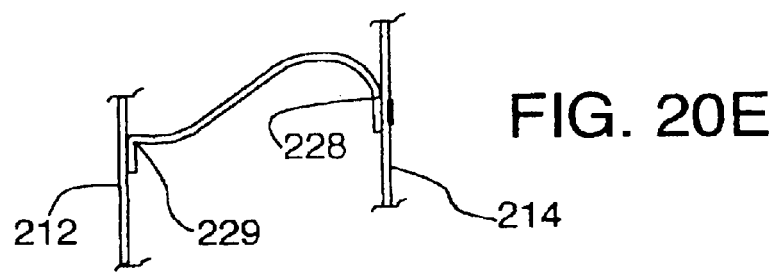
FIG. 20E
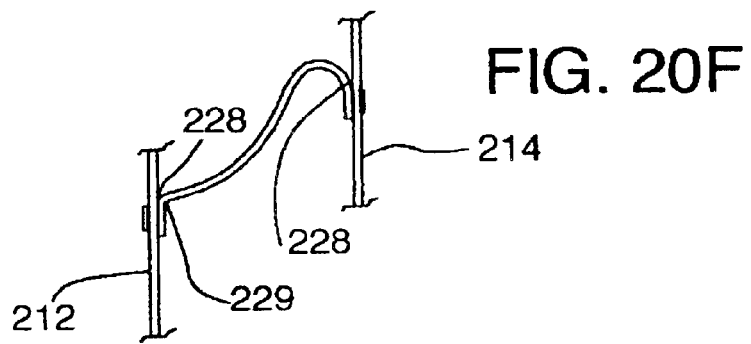
FIG. 20F

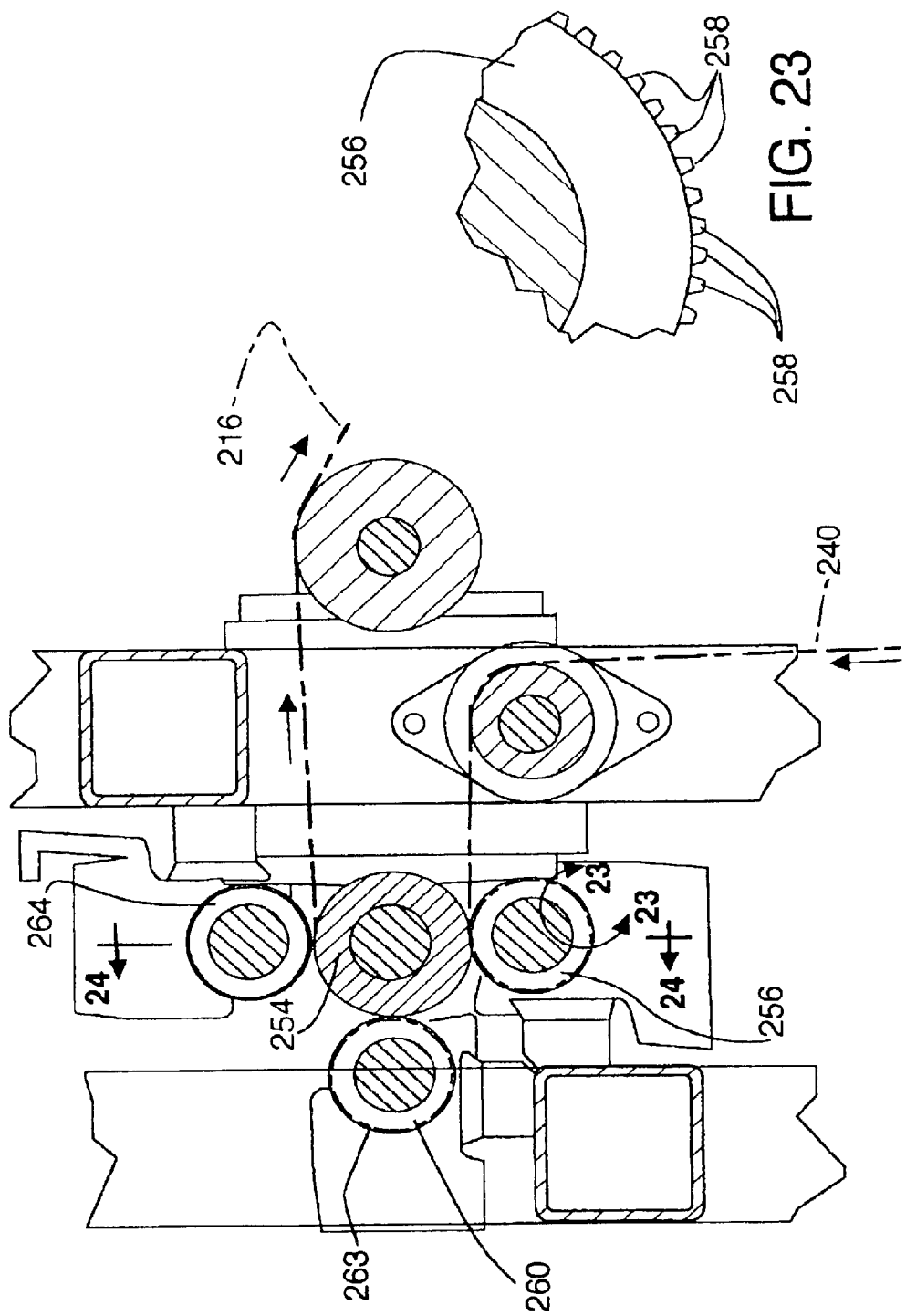

LIGHT-CONTROL WINDOW COVERING AND METHOD AND APPARATUS FOR ITS MANUFACTURE

CROSS-REFERENCE TO RELATED PATENT APPLICATIONS

This patent is a continuation-in-part of U.S. patent application Ser. No. 09/549,969 entitled Light-control Window Covering and Method and Apparatus For Its Manufacture filed Apr. 14, 2000, now U.S. Pat. No. 6,484,786 and which is incorporated herein by reference.

FIELD OF THE INVENTION

The present invention relates generally to the field of window coverings, and more particularly, to a light-control window covering and a method and apparatus for its manufacture.

BACKGROUND OF THE INVENTION

Light-control window coverings typically include a front and rear portion made from a sheer material and a plurality of opaque vanes extending between the sheer materials. The light-control covering is movable from an open, light-passing position in which the vanes are horizontal, to a light-blocking position in which the vanes are substantially vertical. The prior art light-control window coverings and the apparatus and method for the manufacture of the light-control coverings have a number of problems and shortcomings. One problem with these light-control products is the lack of strength of the connection between the vanes and the sheer materials. Additionally, the appearance of the connection between the vanes and the sheer materials may be uneven or may not adequately match the color or pattern of the vanes and/or sheer material. Further, the profile of the vanes of some of these light-control products does not maximize the viewable area when the light-control window covering is in the light-passing position. Additionally, the apparatus and method for manufacturing the light-control window coverings are slow and require that only a portion of the light-control product be assembled at a time.

Numerous methods have been developed to form light-control window coverings. U.S. Pat. Nos. 3,384,519 and 3,661,665 to Froget disclose a method of welding the marginal edges of a plurality of vanes to two layers of material. First, each vane is welded to one face of the first layer of material. As each vane is welded to the first layer of material, the first layer and the welded vane are wound onto a reel. After all of the vanes have been welded to the first layer of material and wound onto a reel, the combination is then unwound such that the free edge of each vane comes into contact with a second layer of material. The free edge is then welded to the second layer of material. In this manner a light-control window covering is formed with one face of the vane being welded at its marginal edge to the first layer and the second face of the vane being welded at its second marginal edge to the second layer.

U.S. Pat. No. 5,313,999 to Colson et al. describes a method and apparatus for forming a light-control window covering in which one side of individual vanes are attached with adhesive to a first continuous sheet of material and the other side of the vanes are then attached with adhesive to a second continuous sheet of material. The first and second sides of each vane are attached to the first and second sheets one at a time. Colson et al. argued that the Froget window covering had a number of undesirable features, including an "uneven outer appearance"; "producing unwanted crimps and creases in the material, which can result in fatigue failure"; that the process is a "relatively slow process"; "that heat welds are limited in strength"; and "the difficulty in achieving uniformly straight heat welded joints over an extended length." (See col. 1 line 66-col. 2 line 17).

However, the solutions proposed by Colson et al. also have a number of drawbacks. First, the adhesive that is used to provide the bond between the vanes and the sheer materials is applied to one vane at a time, making the manufacturing process relatively slow. Additionally, the adhesive requires special additives to reduce yellowing and discoloration of the adhesive as well as subsequent processing of the bond to "roughen" the glue to provide a dull appearance. Another problem with the Colson et al. window covering is the bias of the vanes toward the light-blocking position. This bias requires additional force to move the vanes to the light-passing position and to maintain them in that position. Further, one embodiment of the light-control window covering of Colson et al. requires that the vanes do not have a crease but rather have smoothly curving portions (see col. 16 lines 25–30) and therefore do not allow for a straighter appearance of the vane. This feature reduces the viewable area when the light-control window covering is in the light-passing position. Colson et al. does disclose a second embodiment with a bend that is formed by scoring the vane material. Scoring the vane material, unlike perforating, creates a line of weakness that could result in failure of the light-control covering.

U.S. Pat. No. 5,228,936 to Goodhue, describes a method and apparatus for forming a light-control window covering, in which all of the vanes are attached with adhesive to the first and second sheets simultaneously. As in Froget and Colson, one side of each vane is attached to a first sheet and the other side of each vane is attached to a second sheet. Since the vanes are applied to the first and second sheets side by side, the vanes do not overlap when the window covering is in the light-blocking position. As a result, light is likely to pass through the spaces between adjacent vanes in the closed.

U.S. Pat. No. 5,888,639 to Green et al. discloses a method and apparatus for forming a light-control window covering formed by continuously welding three substrates of material together to form a three-substrate web having first and second light-control regions and a center vane or opaque region located there between. Portions of the three-substrate web are laterally offset from one another and are adhesively attached to form a light-control window covering. While this process increases the speed of manufacture of the light-control product, it still requires both an adhesive and welding operation. Additionally, it precludes the use of a single continuous sheet of sheer material for the light-control window covering.

U.S. Pat. Nos. 5,846,360; 5,885,409; and 5,891,208, to Gilldisclose a method and apparatus for manufacturing a multilayer filter by attaching first and second filter layers to a plurality of ribbons utilizing ultrasonic welding equipment.

It would be desirable to form a light-control window covering in which all of the vanes are simultaneously attached to the first and second sheets where the vanes of the resultant light-control window covering overlap one another in the light-blocking position. It would also be desirable to form a light-control window covering without the need for an adhesive bond resulting further in the need for adding materials to the adhesive to reduce yellowing, or processing of the bond to dull the adhesive bond. It would also be desirable to form a light-control window covering that had an increased viewable area when the light-control window covering is in the light-passing position. It would be further desirable to form a light-control window covering with a strong bond without the need for adhesive. It would also be desirable to form a light-control window covering in which at least one of the attachment areas between the vane and the sheer material is hidden by a portion of the vane, when the light-control window covering is in the light-passing position. It would also be desirable to form a light-control window covering with all of the benefits noted above.

SUMMARY OF THE INVENTION

Accordingly, an embodiment of the invention is a light-control window covering where all of the vanes are simultaneously attached to the first and second sheets. The vanes of the resultant light-control window covering overlap one another in the closed or light-blocking position.

Another feature of the light-control window covering includes ultrasonic welds between the vanes and the sheer material without the need for an adhesive bond. The ultrasonic weld does not yellow, and/or does not have a gloss appearance, and/or blends in with the sheer materials and the vanes, and/or has its own pattern.

A further feature of the light-control window is that each vane includes a crease to provide a greater viewing area when the light-control window covering is in the light-passing position.

Another feature of the light-control window covering is that a ribbon of thermoplastic material is attached to the first and/or second sheer material to increase the strength of the welds between the vane and the sheer material.

In another embodiment of the light-control window covering, a ribbon is attached to the sheer material and masks the appearance of the weld of the vanes and sheer material.

One embodiment relates to a light-control window covering comprising a first sheer material, and a second sheer material. A plurality of vanes having perforations are operatively connected to the first and second sheer materials. Each vane bends proximate the perforations as the first and second sheer materials are moved relative to one another.

A further embodiment includes a light-control window covering including a first sheer material, and a second sheer material spaced apart from the first sheer material. Each sheer material has a first face and a second face. A plurality of vanes have a first and a second longitudinal margin adjacent a first face of the first and second sheet of sheer materials respectively. A plurality of ribbons are adjacent the second face of at least one of the first and second sheets of sheer material. Each ribbon is ultrasonically welded to one of the first and second sheer materials and to a respective longitudinal margin of the vane.

Another embodiment includes a method for manufacturing the light-control window covering comprising feeding a first and a second sheet of sheer material spaced apart from and parallel to one another. Each sheet of sheer material has a first side and a second side. A plurality of strips of vane material are provided, each strip of vane material having a pair of longitudinal edges and a predetermined width as measured between the longitudinal edges, a center region, a first side and a second side, and first and second longitudinal margins. A plurality of spaced apart ribbons are provided proximate the second side of a respective first and second sheet of sheer material. Each strip of vane material is separated from an adjacent strip of vane material by a predetermined distance that is less than the predetermined width of the strip of vane material. The strips of vane material are attached to the first side of the sheet of sheer material along the first longitudinal margin. The strips of vane material are attached to the second sheet of sheer material along the second longitudinal margin. The plurality of spaced apart ribbons are attached to at least one of the sheets of sheer material and to the vanes.

Still another embodiment includes an apparatus for manufacturing a light-control window covering having a first sheet of sheer material, a second sheet of sheer material, a plurality of vanes and a plurality of ribbons. The apparatus includes a perforating station for perforating the vanes and a plurality of spaced apart folders for folding the longitudinal margins of the vanes. A plurality of first ultrasonic welders weld a first longitudinal margin of each vane to the first sheet of sheer material and to a respective ribbon. A plurality of second ultrasonic welders weld a second longitudinal margin of each vane to the second sheet of sheer material and to a respective ribbon. The apparatus also includes a plurality of rotary anvils located between the first and second sheets of sheer material for attaching each respective vane to the second sheet of sheer material and to each respective ribbon.

These and other features of the present invention will be apparent upon consideration of the following detailed description of preferred embodiments thereof, presented in connection with the following drawings in which like reference numerals identify like elements throughout. All of the features discussed herein may be combined with any other feature or combination of features whether or not the combination is specifically recited.

BRIEF DESCRIPTION OF THE DRAWINGS

FIG. 1 is a perspective view of a light-control window covering;

FIG. 2A is a cross-sectional view of the light-control window covering of FIG. 1 in the light-passing position taken along lines 2A—2A of FIG. 1;

FIG. 2B is a cross-sectional view of the light-control window covering of FIG. 2A in the light-blocking position;

FIG. 2C is a cross-sectional view of a portion of a light-control window covering with s-shaped vanes;

FIG. 20B is a cross-sectional view of the light-control window covering of FIG. 20 in a partial light-passing position;

FIG. 20C is a cross-sectional view of the light-control window covering of FIG. 20 in a partial light-passing position;

FIG. 20D is a cross-sectional view of the light-control window covering of FIG. 20 in the same light-passing position;

FIG. 20E is a cross-sectional view of the light-control window covering of FIG. 20 in a partial light-passing position;

FIG. 20F is a cross-sectional view of the light-control window covering of FIG. 20 in a partial light-passing position;

FIG. 22 is a partial cross-sectional view taken generally along lines 22—22 of FIG. 21B;

FIG. 23 is a fragmentary view of a perforation disc taken generally along lines 23—23 of FIG. 22;

DETAILED DESCRIPTION OF THE PREFERRED EMBODIMENTS

Figure 3:
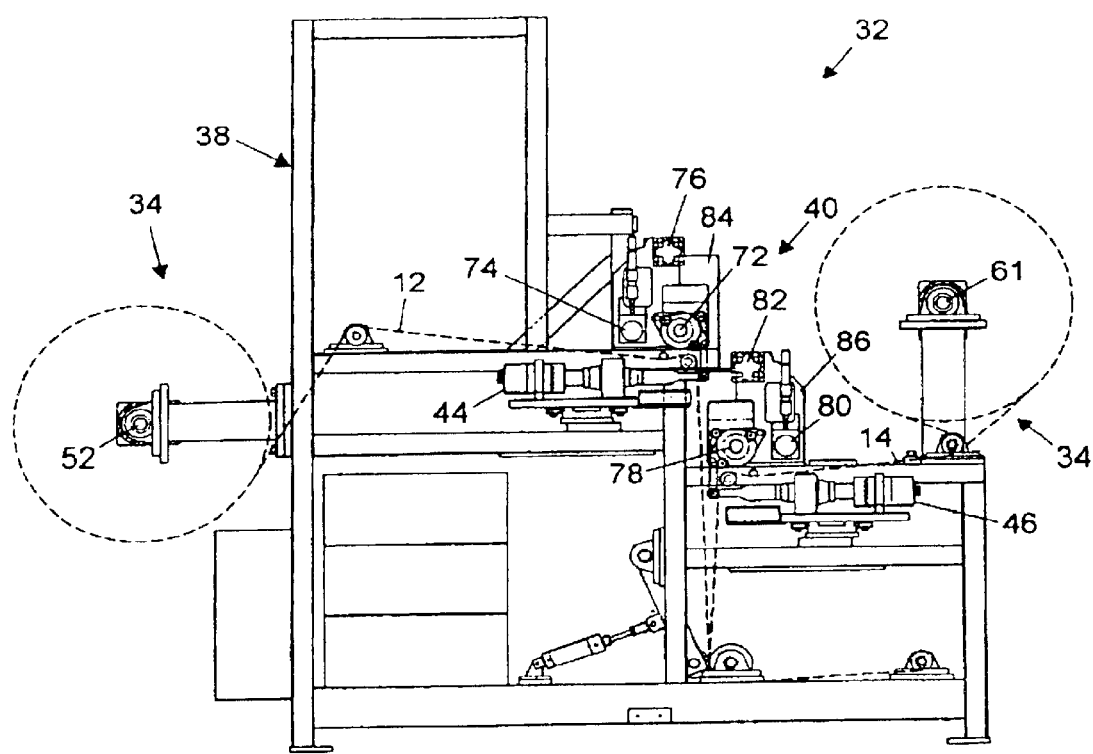
FIG. 3 is a plan view of the apparatus with the frame for manufacturing a light-control window covering of FIG. 1.

Referring to FIG. 1 a light-control window covering 10 includes a first sheet of sheer material 12 and a second sheet of sheer material 14. The first and second sheets of sheer material are disposed substantially parallel to one another.

A plurality of vanes 16 having a first side 18 and a second side 20 are ultrasonically welded to the first and second sheets of material 12, 14. Each vane 16 includes first and second longitudinal edges 22, 24, and a corresponding first and second margin 26, 28. Each vane 16 is formed in a "U" shape with the longitudinal margins 26, 28 of the second side ultrasonically welded to the respective first and second sheets of sheer material 12, 14. In this manner the second side 20 of each vane 16 is adjacent the first and second sheets of sheer material 12, 14 along the respective longitudinal margins 26, 28. The longitudinal margins 26, 28 on the first side of each vane 16 face away from the first and second sheets of sheer material 12, 14 respectively. Each vane 16 is preferably formed of an opaque material.

The term "sheer material" as used herein includes woven, non-woven, natural and synthetic materials with the ability to pass at least a portion of light therethrough. In the preferred embodiment, the first sheet of material is a knit sheer having diamond shape interstices. The first sheet could be formed from either a single or multi-filament yarn. The multi-filament yarn allows for greater movement of the material during the pressing operation that is described below. This helps to minimize puckering or wrinkles in the final light-control window covering. The second sheet of material is also a knit sheer, preferably having differently shaped interstices than the first sheet in order to minimize the moire appearance. The vane material is preferably an opaque knit having a similar elongation to the first and second sheer sheets in order to minimize any wrinkles forming in the product. However, the vane material could also be a woven or non-woven polyester, as well as a film. If the sheets of sheer material and the vanes are attached utilizing adhesive or by sewing with thread, other materials may be used as well including natural materials.

In the preferred embodiment all three materials are made from polyester or other compatible material or film that can be welded. However, other types of material could be used such as fabric where an adhesive or thread is used to attach the vane material to the first and second sheets of sheer material. It is also desirable that the opaque vanes have a relative elongation characteristic equal to or greater than the first and second sheer sheets.

In a horizontal embodiment, the vanes 16 are substantially horizontal in a first light-passing position. (See FIG. 2A). In the preferred embodiment the light-control window covering is placed in a window such that the first sheet of sheer material 12 faces inward and the second sheet of sheer material 14 is close to or facing the window. The longitudinal margins 26, 28 are welded to the first and second sheets of sheer materials 12, 14 on the second side 20 of the vane material. As a result, each vane 16 is U-shaped. In the light-passing position, the center regions 30 of the vanes 16 are horizontal and parallel to one another. The light-control window covering 10 can be moved to a light-blocking position by shifting the first and second sheets of sheer material 12 and 14 relative to one another. (See FIG. 2B). In the preferred embodiment, the second sheet of sheer material 14 is shifted upward relative to the first sheet of sheer material 12. As a result, the center region 30 of each vane 16 is shifted to a substantially vertical position thereby blocking light from passing through the window covering 10. In the light-blocking position the first longitudinal margin 26 is substantially coplanar with the center region 30 of each vane, while the second longitudinal margin 28 is bent at a crease 31 approximately one hundred and eighty degrees relative to the plane of the center region 30. In the preferred embodiment, when the light-control window covering 10 is in the light-blocking position, the first longitudinal margin 26 of one vane 16 overlaps the longitudinal margin 28 of an adjacent vane 16.

Figure 4:
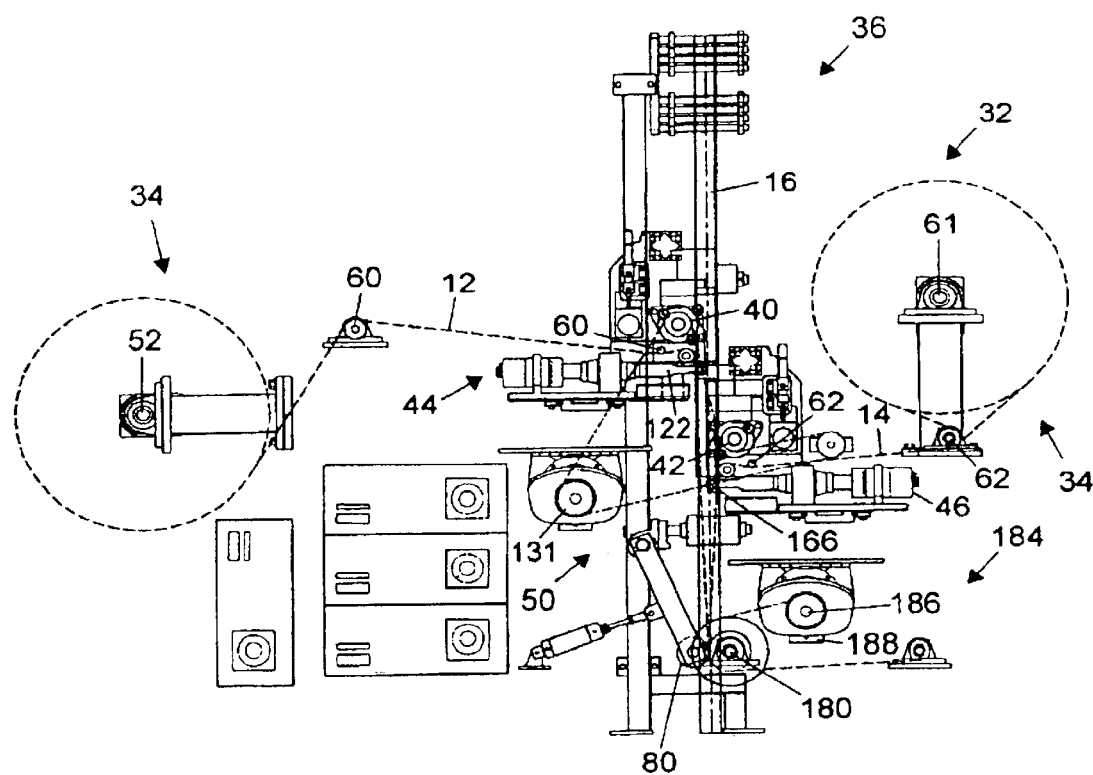
FIG. 4 is a plan view of the apparatus with the vane feeding assembly frame for manufacturing a light-control window covering of FIG. 1.

An apparatus 32 is illustrated in FIGS. 3 and 4 for manufacturing the light-control window covering 10. The apparatus 32 includes a first and second sheer sheet material feeding assembly 34 and a vane or ribbon feeding assembly 36 for simultaneously feeding a plurality of vane materials 16 to the apparatus 32 for simultaneous processing. A frame 38 supports a plurality of upper and lower folding assemblies 40, 42 for positioning respective pieces of vane material 16 in a "U" shape as they are welded to the first and second sheets of sheer material 12, 14 with an ultrasonic welder. The apparatus 32 includes first and second, or upper and lower welding stations 44, 46 for each respective vane. As described below, a first shifter assembly 47 shifts the welded structure from an open three dimensional position to a closed two dimensional position for setting in the heat setting assembly 48. The heat setting assembly 48 removes any undesirable creases that may form in the vane 16 and first and second sheets of sheer materials 12, 14, during the manufacturing process. A drive system 50 guides the sheet materials and vane material from the feeding assemblies 34, 36 through the upper and lower folding assembly 40, 42, through the welding stations 44, 46, through the heat setting assembly 48, and to a take up reel (not shown) for storage and subsequent fabrication.

The sheet material feeding assembly 34 includes a first spindle 52 attached to the frame 38 for rotatably supporting a reel of first sheet material 12. The width of the first sheet of sheer material 12 as it is being fed from the spool will be referred to as the cross direction, while the length of the first sheet of sheer material 12 as it is being fed from the spools will be referred to as the longitudinal direction. The cross direction of the first sheet of sheer material 12 represents the length of the horizontal light-control window covering, and the longitudinal direction represents the width of the horizontal light-control window covering.

The first sheet of sheer material 12 is threaded over rollers 60 and presented to the first welding station 44 in a vertical position such that the front face of the first sheet of sheer material 12 is facing the welding station 44. Similarly, a second spindle 61 attached to the frame 38 supports a reel of second sheet of sheer material 14. The second sheet of sheer material 14 is threaded over rollers 62 and presented in a vertical position such that its front face is facing the second welding station 46.

Figure 5:
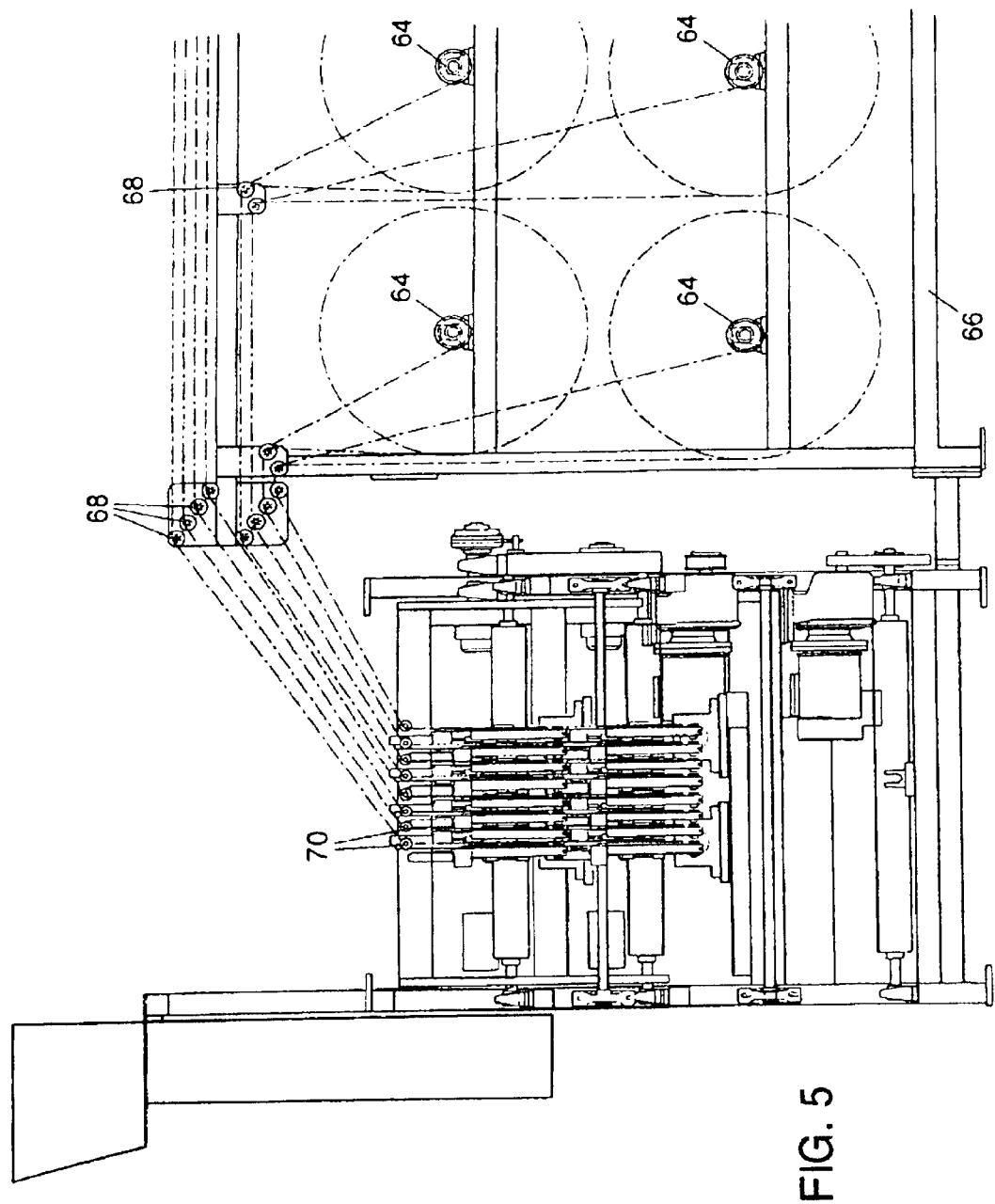
FIG. 5 is a plan view of the vane material feeding apparatus.

As illustrated in FIG. 5, the vane material feeding assembly 36 includes a plurality of spindles 64 secured to a support 66. Spools 67 of vane material 16 are rotatably supported on respective spindles 64. The vanes 16 of the window covering 10 are designated with the same reference numeral as the vane material 16, since the vanes 16 are formed from the vane material 16. Each piece of vane material 16 is threaded over rollers 68 that are attached to the support 66 and threaded over a vane guide roller 70 attached to the frame. Each guide roller 70 aligns respective vane material 16 with a respective upper folder assembly 40.

As a result, each piece of vane material 16 is presented to a respective upper folder assembly 40 in a vertical orientation, and such that all of the pieces of vane material 16 are parallel to one another. The space between each piece of vane material 16 as it is presented to the upper folding assembly 40 determines the spacing of the vanes 16 in the final light-control window covering 10. The vane material 16 is fed into apparatus 32 such that the second side 20 of the vane material is perpendicular to the second face of the first sheet of sheer material 12. In the preferred embodiment the width of the vane material 16 is between about 2.0 inches and 2.25 inches and may be 2.110 inches.

Referring to FIGS. 6–9 the frame 38 includes an upper folder assembly shaft 72 and upper first and second cross-members 74, 76 extending the width of the frame 38 to support the first folding assemblies 40. Similarly, the frame 38 includes a lower folder assembly shaft 78 and lower first and second cross-members 80, 82 extending the width of the frame 38 to support the lower folder assemblies 42.

A plurality of upper brackets 84 secure the upper folder assembly shaft 72, and upper first and second cross-members 74, 76 to one another at various points along their length to ensure greater stability of the first folding assemblies 40. Similarly, a plurality of lower brackets 86 secure the lower folder assembly shaft 78, and lower first and second cross-members 80, 82 to one another at various points to ensure greater stability of the second folding assemblies 42.

Figure 6:
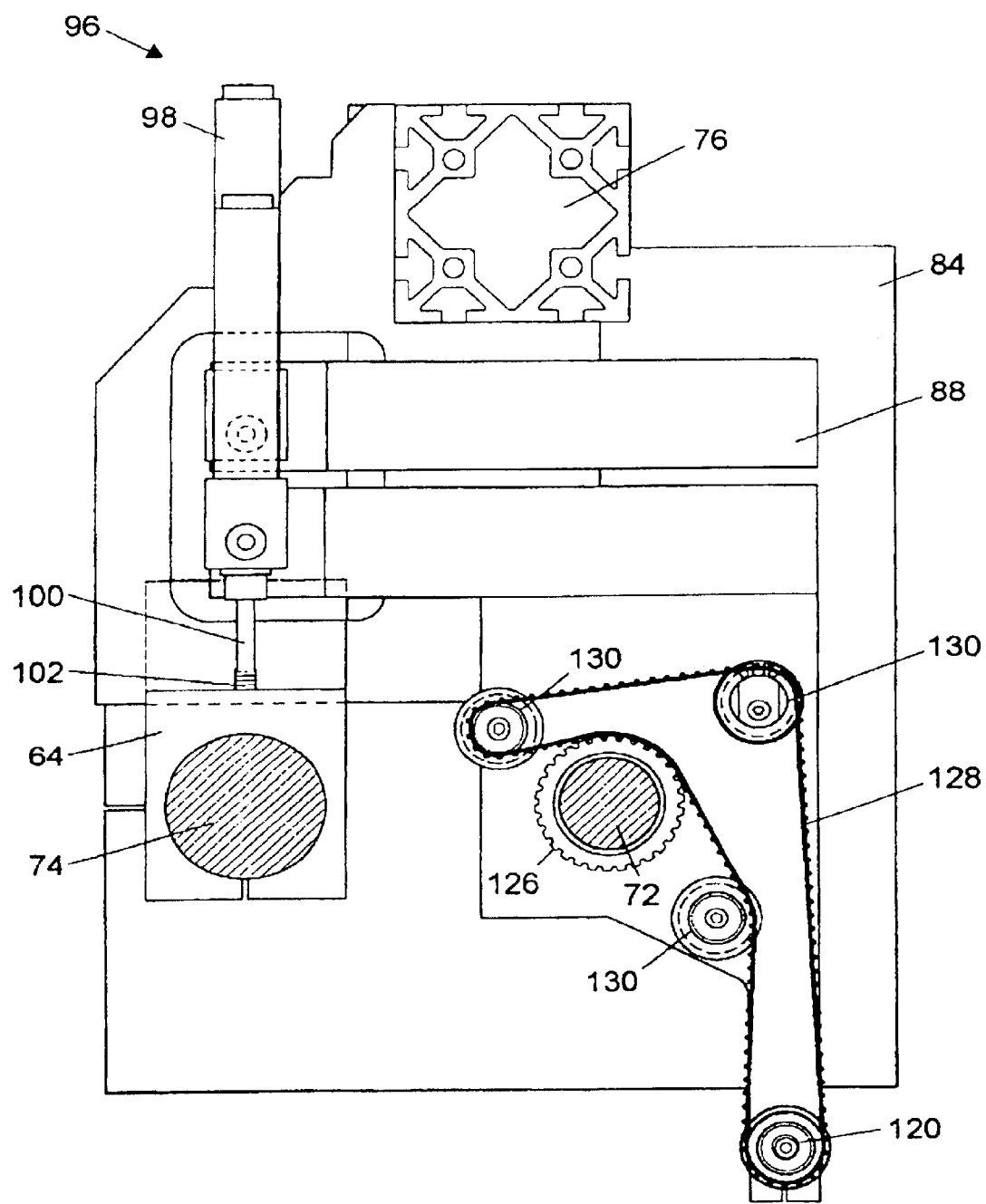
FIG. 6 is a plan view of the upper folding assembly.
Figure 7:
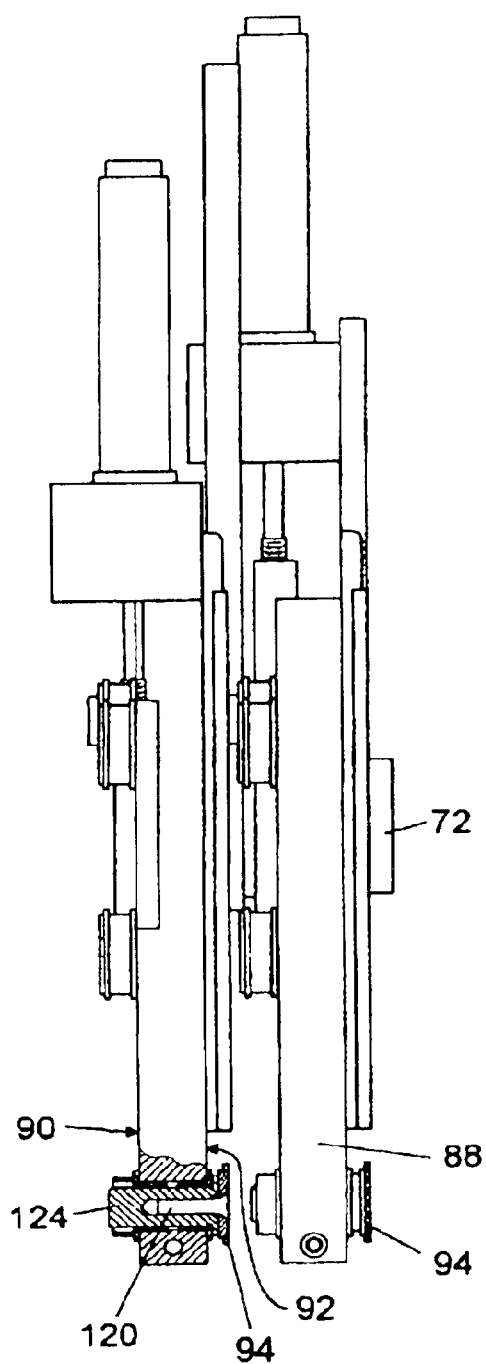
FIG. 7 is a side view of the upper folding assembly of FIG. 6.

Referring to FIGS. 6 and 7, the upper folder assembly 40 includes an upper folder assembly bracket 88 having a first side 90 and second side 92. The upper folder assembly bracket 88 is rotatably mounted on the upper folder assembly shaft 72 to position an upper anvil 94 proximate the upper welder 44. An arm 96 including a cylinder 98 and an extension 100 is attached to the first side 90 of the upper bracket 88. In the exemplary embodiment the cylinder 98 is pneumatic, however, a hydraulic cylinder or any other mechanical control mechanism to extend an extension member could be employed. The extension 100 travels in or out of the cylinder 98 based on pressure provided in the cylinder. The free end 102 of the extension 100 is attached to the upper first cross member 74 with an arm support 104. Movement of the extension 100 in or out of the cylinder 98 causes the bracket 88 to rotate in a first and second direction respectively about the upper folder assembly shaft 72.

Figure 10:
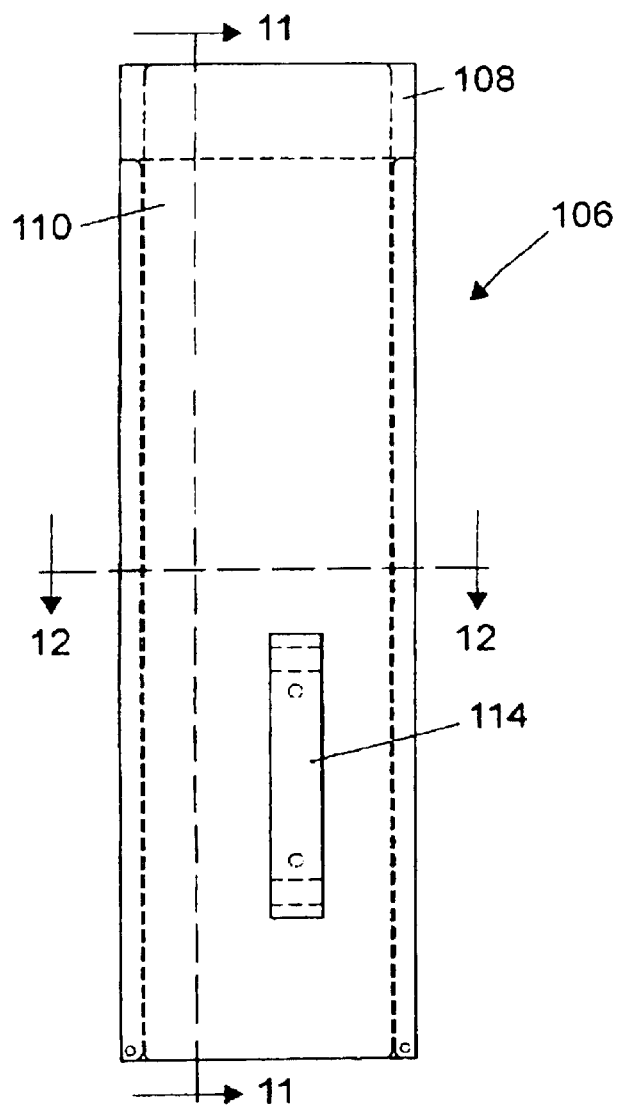
FIG. 10 is a plan view of the upper folder assembly.
Figure 11:
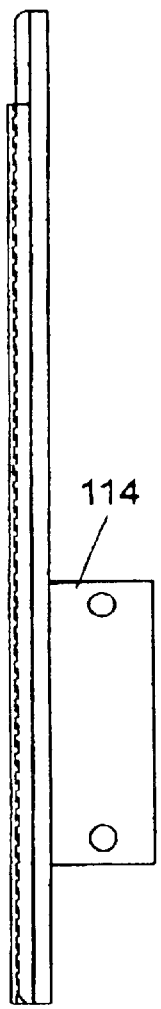
FIG. 11 is a cross-sectional view of the upper folder assembly taken along lines 11—11 of FIG. 10.
Figure 12:
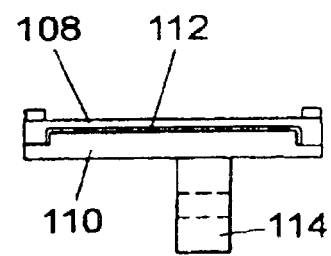
FIG. 12 is a cross-sectional view of the upper folder assembly taken along lines 12—12 of FIG. 10.

Referring to FIGS. 10–12, the first or upper folder assembly 40 includes an upper folder or chute 106 having an exterior plate 108 and an interior plate 110 positioned within the exterior plate 108. The combined exterior plate 108 and interior plate 110 form a U-shaped channel 112 which bends the vane material 16 into a "U" shape The exterior and interior plates 108, 110 are secured together with a plurality of screws to facilitate cleaning the U-shaped channel by permitting separation of the plates. The interior plate 108 is attached to a mounting bracket 114 with fasteners for attachment to the second side 92 of the upper folder assembly bracket 88.

The width of the flat portion of the U-shaped channel 112 is less than the width of the vane material 16. Thus, the vane material 16 must bend to fit through the U-shaped channel 112. The vane material 16 is placed in the upper folder 106 so that the longitudinal margins 26, 28 are bent as the vane material 16 exits the bottom of the upper folder 106. When the vane material 16 exits the upper folder 106 the first longitudinal margin 26 is adjacent the first sheet of sheer material 12.

The upper anvil 94 is rotatably attached to the second side 92 of the upper folder assembly bracket 88 with a pin 120. The upper anvil 94 is located close to the bottom of the upper folder 106. The upper anvil 94 is located on the upper folder assembly bracket 88 such that movement of extension 100 out of the cylinder 98 will cause the upper anvil 94 to move towards the welder 44, pressing the first longitudinal margin 26 of the vane material 16 and the first sheet of material 12 against a horn 122 of the first welder 44. Conversely, movement of the extension 100 into the cylinder 98 will cause the upper anvil 94 to move away from the horn 122 of the first welder 44.

The upper anvil 94 is driven by an anvil drive gear 124 located on the first side 90 of the upper folder assembly bracket 88 and is rotatably connected to the anvil 94 by the pin 120. The anvil drive gear 124 is in turn driven by anvil drive pulley 126 that rotates the upper folder assembly shaft 72. A belt 128 connects the anvil drive pulley 126 with the anvil drive gear 124 to rotate the anvil 94. The belt 128 is supported by a number of idler guide rollers 130. An end drive gear that is driven by a motor 131 rotates the upper folder assembly shaft 72. In this manner each anvil 94 is rotated at the same rate to ensure uniform welding of the vane material 16 to the first sheet of sheer material 12.

The lower folder assembly 42 includes similar components but uses a different folder as will be described below. Each of the components in the lower folder assembly 42, although similar to the components in the upper folder assembly 40 will be identified with a separate reference numeral for clarity.

Figure 8:
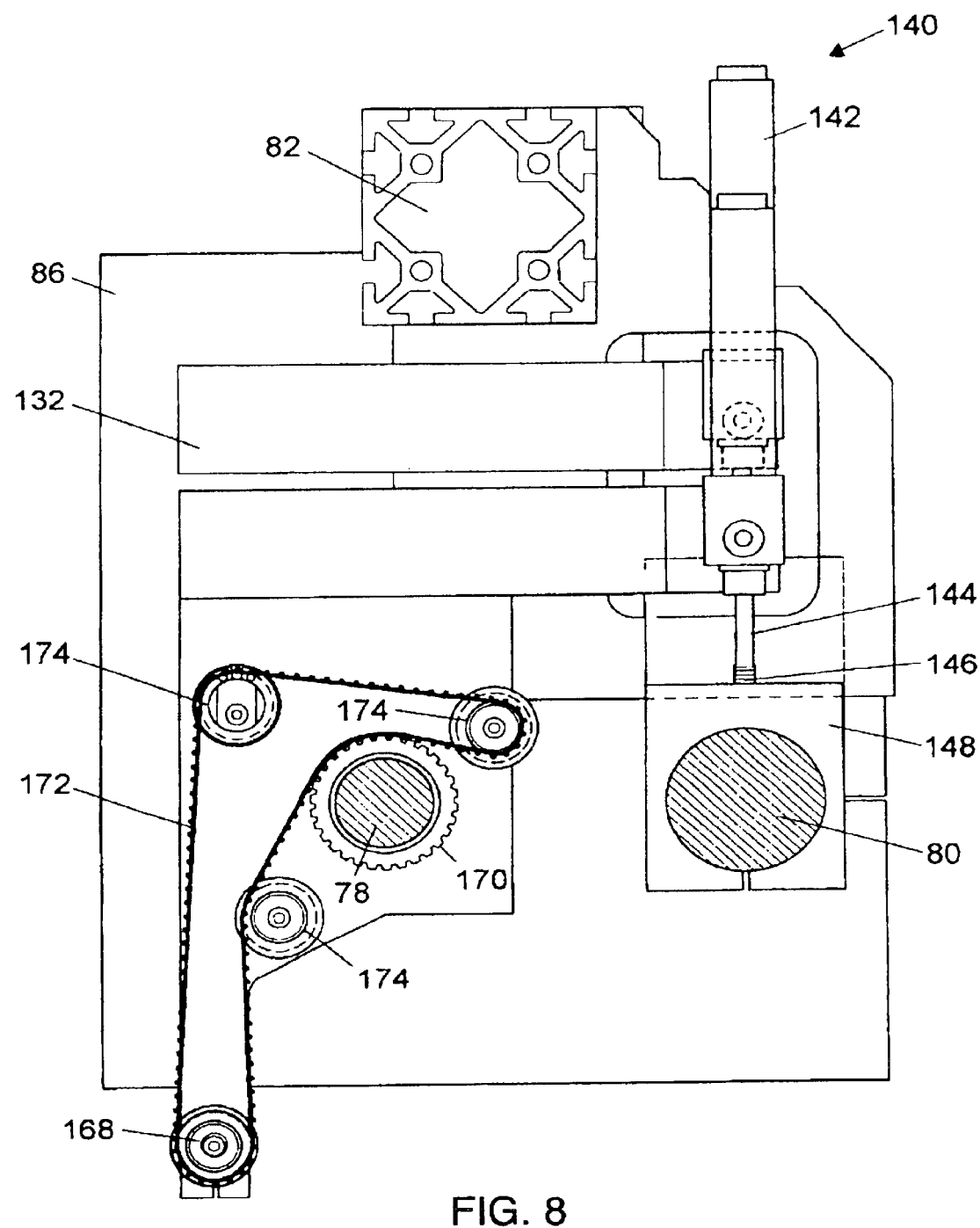
FIG. 8 is a plan view of the lower folding assembly.
Figure 9:
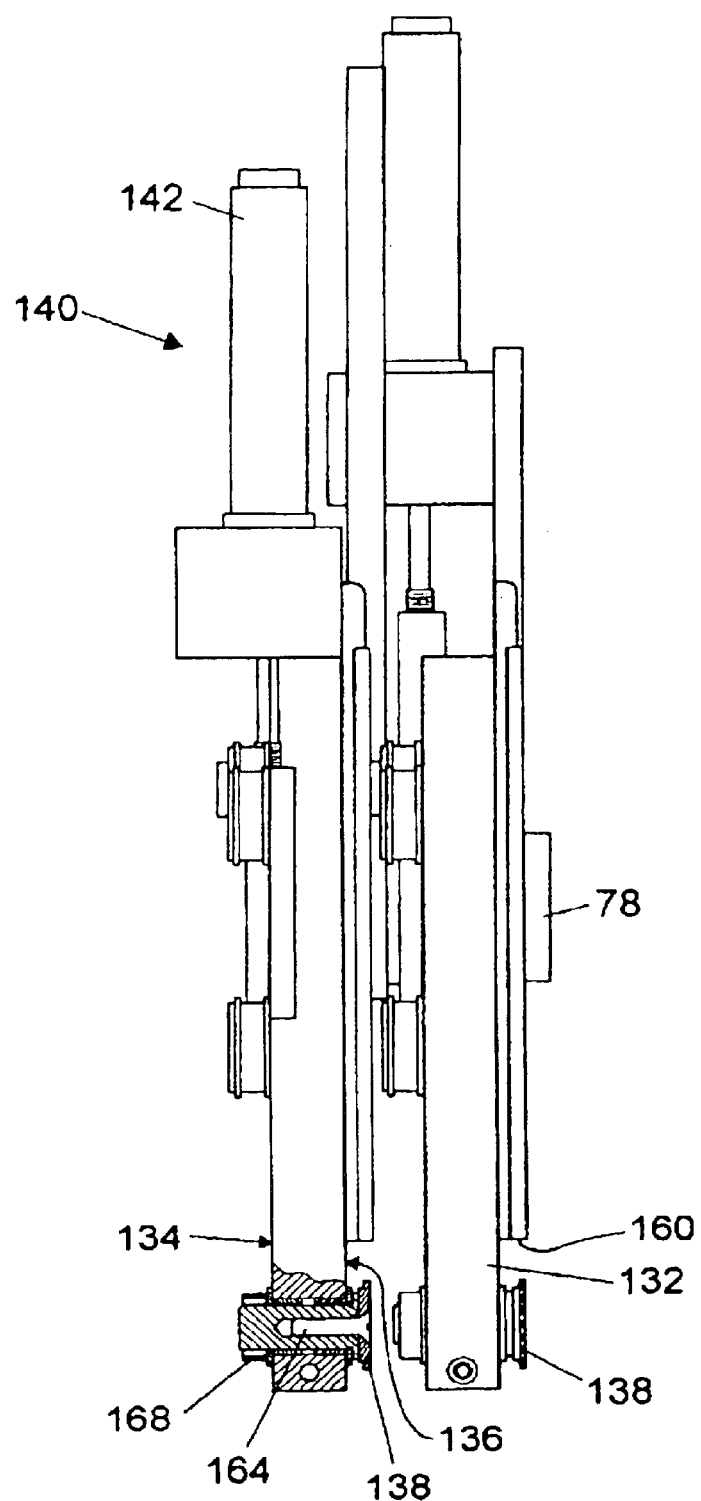
FIG. 9 is a side view of the lower folding assembly of FIG. 6.

Referring to FIGS. 8 and 9 the lower folder assembly 42 includes a lower folder assembly bracket 132 having first and second sides 134, 136. The lower folder assembly bracket 132 is rotatably mounted on the lower folder assembly shaft 78 to position a lower anvil 138 proximate the lower welder 46. An arm 140 including a cylinder 142 and extension 144 is attached to the first side 134 of the bracket 132. As discussed above, in the exemplary embodiment the cylinder 142 is pneumatic; however, a hydraulic cylinder or any other mechanical control mechanism to extend an extension member could be employed. The extension 144 travels in or out of the cylinder 142 based on pressure provided in the cylinder. The free end 146 of the extension is attached to the lower first cross member 80 with an arm support 148. Movement of the extension 144 in or out of the cylinder 142 causes the bracket 132 to rotate in a first or second direction respectively about the lower folder assembly shaft 78.

Figure 13:
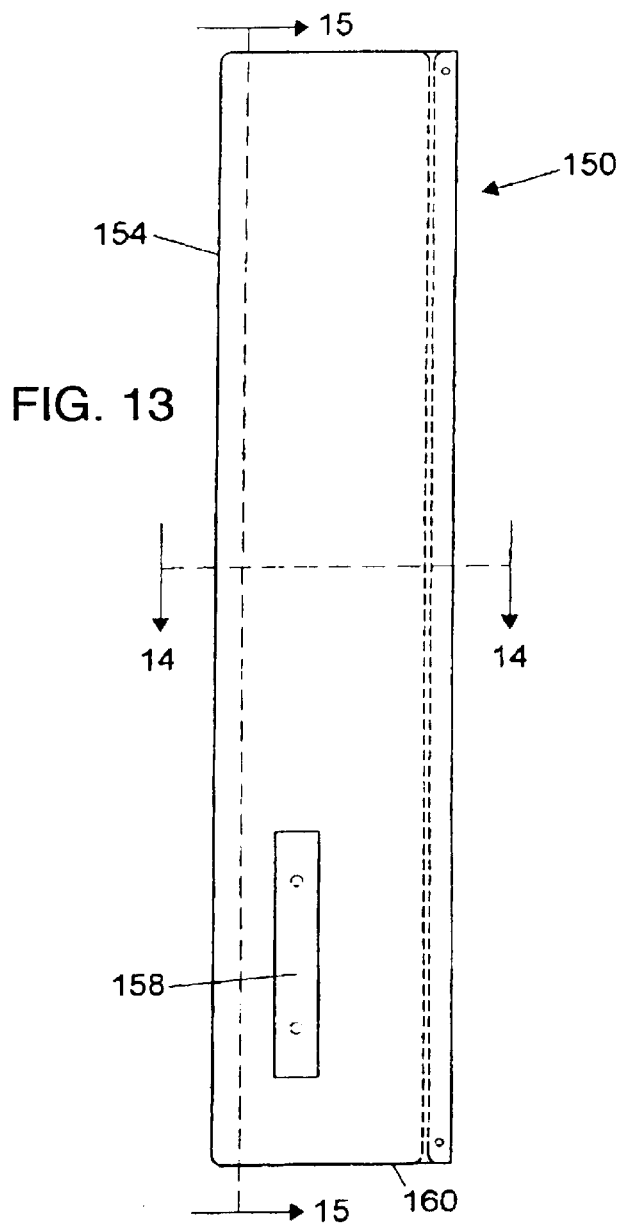
FIG. 13 is a plan view of the lower folder assembly.
Figure 14:
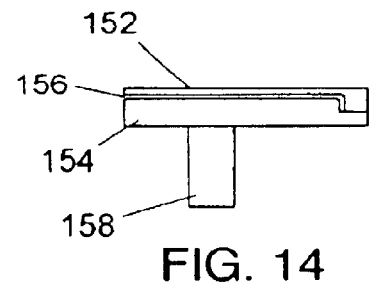
FIG. 14 is a cross-sectional view of the lower folder assembly taken along lines 11—11 of FIG. 10.
Figure 15:
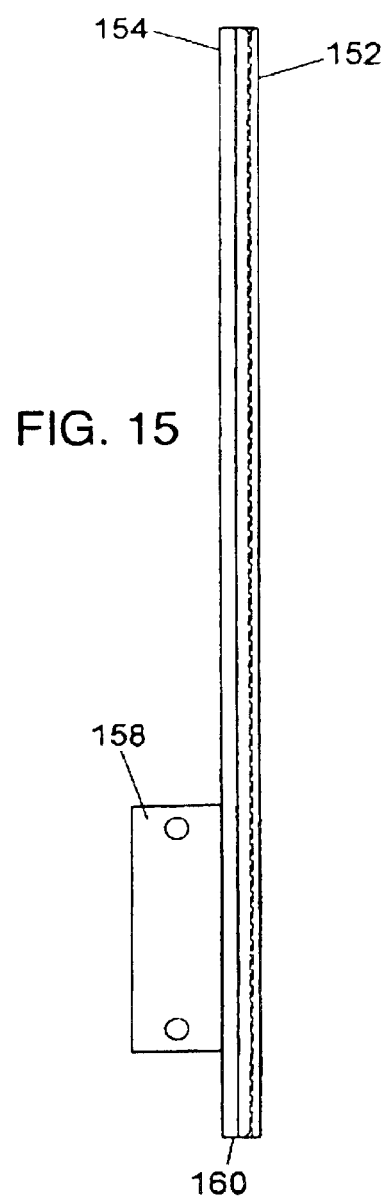
FIG. 15 is a cross-sectional view of the lower folder assembly taken along lines 12—12 of FIG. 10.

Once the vane material 16 is welded to the first sheet of sheer material 12, the vane material 16 and first sheet of sheer material 12 are guided to the lower folder assembly 42. Since the vane material 16 is welded to the first sheet of sheer material 12, the lower folder assembly 42 must accommodate the first sheet of sheer material 12. Accordingly, as illustrated in FIGS. 13–15 a lower folder or chute 150 includes an external and an internal plate 152, 154 to form an L-shaped or right-angled channel 156 which bends the second longitudinal margin 28 of the vane material 16 into the U-shaped vane material 16 as described above.

The exterior and interior plates 152, 154 are secured together with a plurality of screws to permit easy access to the L-shaped channel for cleaning. The internal plate 154 is attached to a mounting bracket 158 with fasteners for attachment to the second side 136 of the lower folder assembly bracket 132.

The width of the L-shaped channel 156 is less than the width of the vane material 16. Thus, the vane material 16 must bend to fit through the L-shaped channel 156. The vane material 16 is threaded through the lower folder 150 so that the second longitudinal margin 28 is bent as the vane material 16 exits the bottom 160 of the lower folder 150. When the vane material 16 exits the lower folder 150 the second longitudinal margin 28 of the vane material 16 is adjacent the second sheet of sheer material 14.

The lower anvil 138 is rotatably attached to the second side 136 of the folder assembly bracket 132 with a pin 164. The anvil 138 is located close to the bottom portion 160 of the lower folder 150. The lower anvil 138 is located on the lower bracket 132 such that movement of the extension 144 out of the cylinder 142 will cause the lower anvil 138 to move towards the lower welder 46. As a result the second longitudinal margin 28 and the second sheet of sheer material 14 are pressed against a horn 166 of the lower welder 46. Conversely, movement of the extension 144 into the cylinder 142 will cause the lower anvil 138 to move away from the horn 166 of the lower welder 46.

The lower anvil 138 is driven by an anvil drive gear 168 located on the first side 134 of the folder assembly bracket 132 and is rotatably connected to the lower anvil 138 by the pin 164. The anvil drive gear 168 is in turn driven by anvil drive pulley 170 that rotates with the lower folder assembly shaft 78. A belt 172 connects the anvil drive pulley 170 with the anvil drive gear 168 to rotate the anvil 138. The belt 172 is supported by a number of idler guide rollers 174. As discussed above, the lower folder assembly shaft 78 is driven by the same motor 131 that drives the upper folder assembly shaft 72 to maintain uniform welding of the vane material 16 to both the first and second sheets of sheer material 12, 14.

Each horn 122, 166 of welders 44, 46 has a width which can be up to 10 inches and may be moved in a path parallel to the longitudinal axis of the upper and lower folder assembly shafts 72, 78. The vane material 16 is only welded to the first and second sheets of sheer material where the upper and lower anvils 94, 138 press the materials against the horns 166. The horns 122, 166 wear over time in the region that the anvils 94, 138 are pressing. By moving the horns 122, 166 along the path, the life of the horns can be extended. Depending on the spacing of the vane material, each horn can handle a number of anvils. Accordingly, the horn can be shifted up to the spacing of the anvils to extend the life of the horn surface.

Once, the longitudinal margins 26, 28 of the vane material 16 have been welded to the first and second sheet of sheer materials 12, 14, a continuous welded structure is formed. A pair of nip rollers 180 pulls the welded structure through the apparatus. The vane material 16 is welded to the first and second sheets of sheer material 12, 14 in an open or three dimensional position, such that the center region 30 of the vane material 16 is perpendicular to the first and second sheets of sheer materials 12, 14. The welded structure is then closed such that the center region 30 of the vane material 16 is substantially parallel to the first and second sheets of sheer material 12, 14. This requires shifting the sheets of sheer material 12, 14 in the cross machine or horizontal direction as the first and second sheet material 12, 14 and welded vane material 16 exit the second welder 46. If the welded sheets are not shifted, a crease will be formed in the middle of the vane material 16 as it travels through the nip rollers 180.

Figure 16:
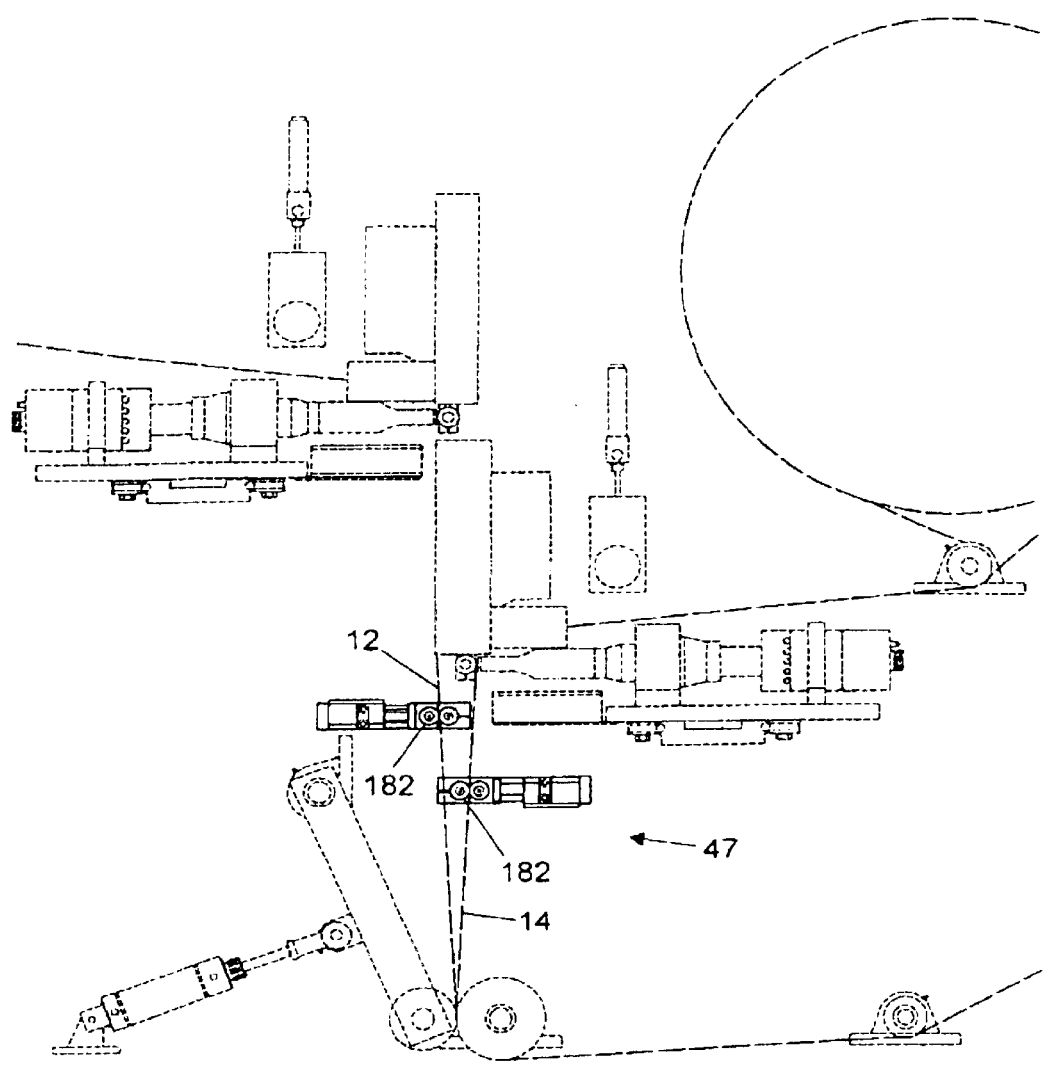
FIG. 16 is a schematic plan view of the apparatus with the first spreading assembly.

The welded structure is moved from the opened position to a closed position prior to being pulled through the nip rollers by the first shifter assembly 47 (see FIG. 16). The first shifter assembly 47 includes a first and second pair of angled bearings or rollers 182. The first pair of angled bearings shift the first sheet of sheer material in the cross-machine direction, while the second pair of angled bearings shift the second sheet of sheer material in the opposite cross-machine direction. In this manner the first and second sheets of sheer material 12, 14 are shifted relative to one another in the cross-machine direction. As a result, the center region 30 of the vane material 16 is substantially parallel to the first and second sheets of sheer materials 12 and 14. However, since the vane material 16 is welded to the first and second sheets of sheer material 12, 14 on the same side of the vane material 16, the first longitudinal margin 26 will be coplanar with the center region 30 of the vane material 16, while the second longitudinal margin 28 will be folded over and adjacent the center region 30 of the vane material 16. Of course if the first and second sheets of sheer material 12, 14 are shifted in the opposite direction, the first longitudinal margin 26 would be folded over and adjacent the center region 30, while the second longitudinal margin 28 would be substantially coplanar with the center region 30.

The nip rollers 180 are driven by the drive assembly 184 including a drive motor 186 and belt 188. A controller synchronizes the nip drive motor 186 and anvil drive motor 131 to coordinate the movement of the vane material 16 and sheer sheet materials 12, 14 through the apparatus.

Figure 17:
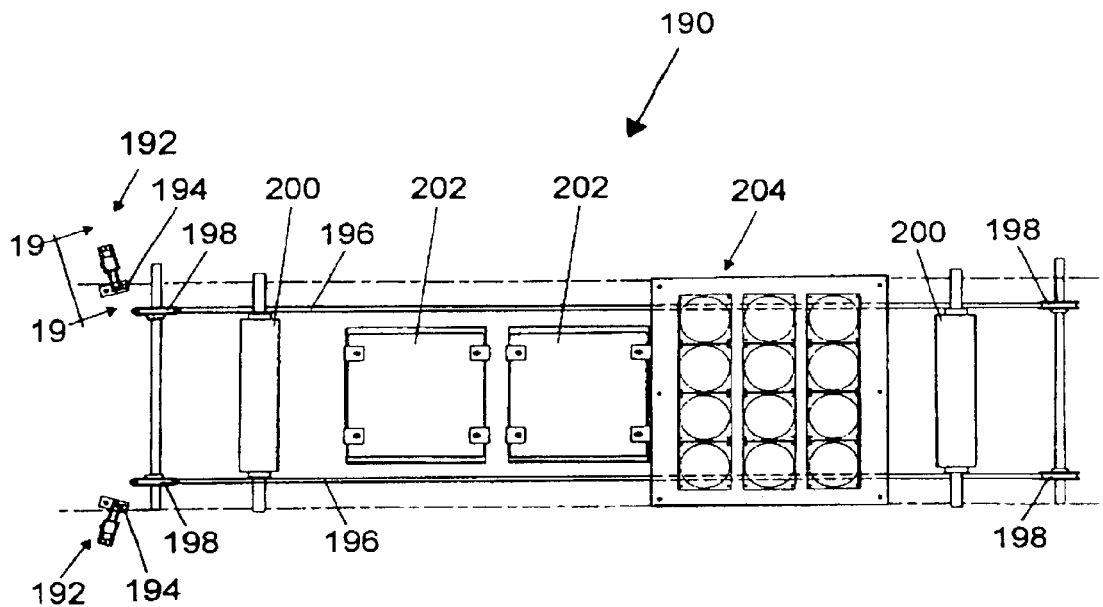
FIG. 17 is a top plan view of the apparatus with the tension assembly and heat setting assembly.
Figure 18:
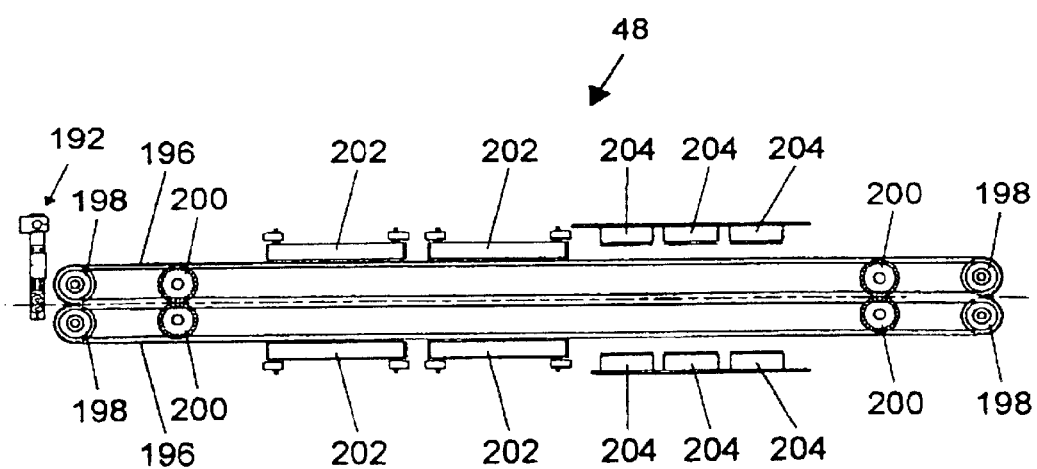
FIG. 18 is a side view of the apparatus of FIG. 17.
Figure 19:
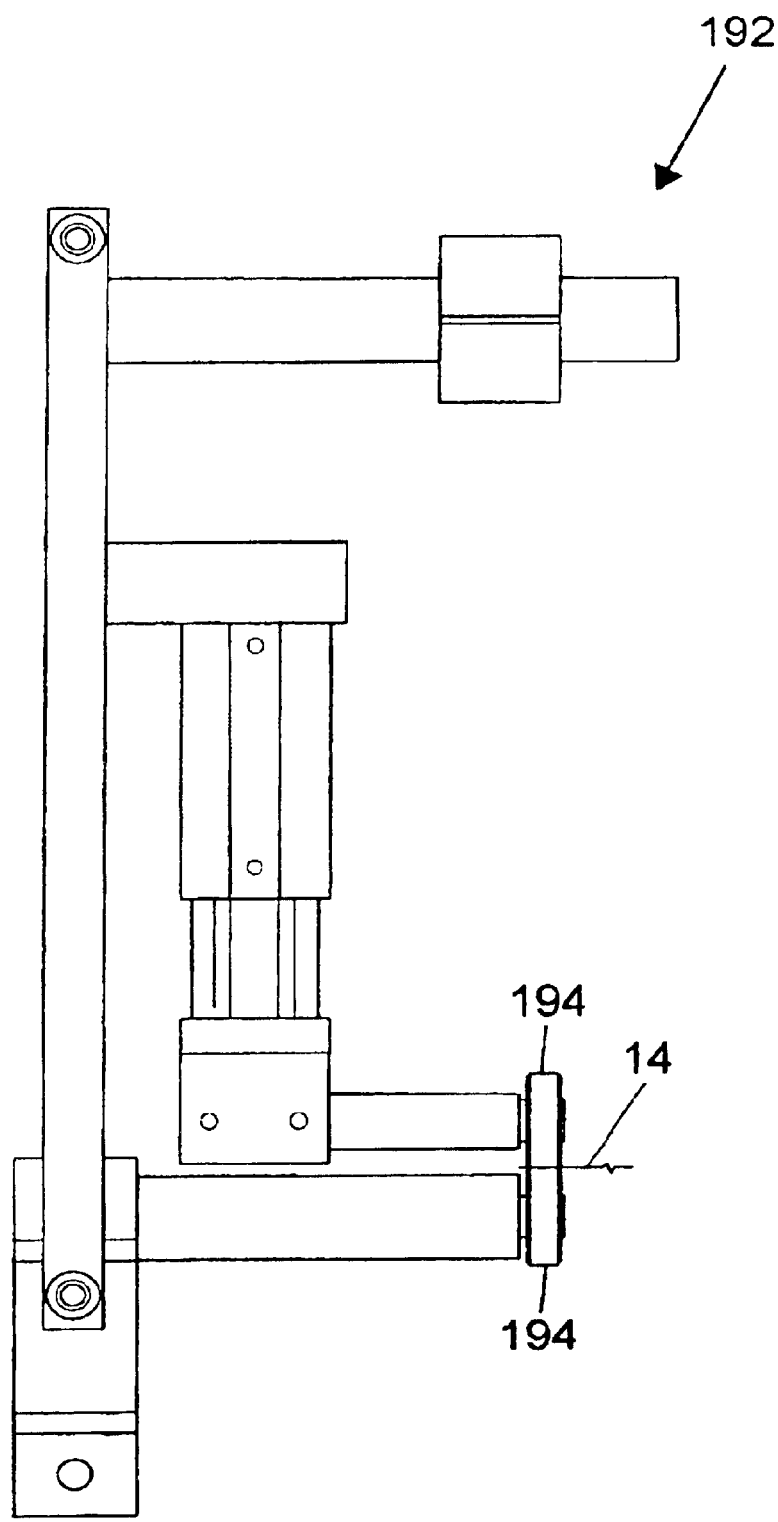
FIG. 19 is a cross-sectional view of the second shifter assembly of FIG. 17 taken generally along lines 19—19.

After the welded vane material 16 and sheer sheet materials 12, 14 are drawn through the nip rollers 180, a tentering apparatus 190 applies a tension to the resultant welded structure across the sheer sheet materials 12, 14 in both the cross-machine direction and the longitudinal direction. Referring to FIGS. 17–19, a second shifter apparatus 192 including a first and second pair of bearings or rollers 194 shifts the first and second sheets of sheer material respectively in the cross-machine direction. The second shifter apparatus 192 both ensures that the welded structure is in the closed position as well as applies a tension to the materials in the cross-machine direction. After the first and second sheets of sheer material have been shifted and tensioned in the cross-machine direction the welded structure is kept in tension in the cross-machine direction by a first and second pair of conveyors or o-rings 196 that are supported by pulleys 198. The o-rings are parallel to one another, but may also be angled to help maintain the tension of the materials in the cross-machine direction.

The first and second sheets of sheer material and the vane material is tensioned in the longitudinal direction by a first and second pair of nip rollers 200. Once the welded structure is tensioned it enters the heat setting assembly 48 to remove any unwanted creases in the welded structure. The welded structure is tensioned in the closed or light-blocking position with center region 30 and the first longitudinal margin 26 of the vane material 16 in a plane parallel to the first and second sheets of sheer materials 12 and 14. The second longitudinal margin 28 is not coplanar with the first longitudinal margin 26 and center region 30 of the vane material 16, but is bent at an edge 31, proximate the first sheet material 12.

In the preferred embodiment, a plurality of radiant heaters 202 that heat both the first and second sheets of sheer material as well as the vane material. The welded structure is then cooled with a plurality of fans 204. A mist of water could be applied to the welded structure prior to being exposed to the radiant heaters as a way of evenly distributing the heat. Alternatively, the welded structure could be pressed with a heated roller and then set by a cooled roller to prohibit the material from going back to its original condition.

Since no adhesive is used in this system, it is possible to heat the welded resultant product to a higher temperature without the concern of the adhesive remelting and flowing in an uncontrolled manner. As a result of the setting assembly all unwanted creases and or puckers are removed from the materials. The heat setting process forms a permanent crease 31 in the vane material at the second longitudinal margin 28.

Once the welded structure has been set, the structure is wound onto a take up spool for subsequent fabrication into the light-control window covering 10 based on a customer's specification. Alternatively, the structure may be cut into flat sheets of predetermined length for subsequent processing. As discussed above, the width of the welded structure determines the greatest possible length of the horizontal light-control window covering. First, based on the width dimension of the desired horizontal light-control window covering 10, that amount of material is cut from the take up spool in the longitudinal direction. Second, if the length of the desired horizontal light-control window covering 10 is less than the width of the welded structure, then the difference is removed from the width of the welded structure. In this manner a horizontal window covering 10 is formed to a customer's specification.

In preferred embodiment, the first sheet of sheer material 12 faces toward the room and away from the window, while the second sheet of sheer material 14 faces or is adjacent the window. As discussed above the width of the vane material is most preferably 2.062 inches, while the longitudinal margins 26, 28 of the vane material are about 0.125 inches. The folder assemblies are set 1.625 inches apart, and as a result the center regions 30 of adjacent vanes 16 are 1.625 inches apart in the light-passing position. In the light-blocking position, the vanes 16 overlap one another by 0.312 inches. In this manner, the folded second longitudinal margin 28 is hidden from view by the first longitudinal margin 26 and center region 30 of an adjacent vane.

It should be understood that the foregoing description is of a preferred exemplary embodiment of this invention, and that the invention is not limited to the specific form shown. For example, the vanes could also be welded to the first and second sheets of sheer material 12 and 14 in a s-shaped configuration. If the first longitudinal margin of the vane material is welded to the first sheet of sheer material 12 on its first face, while the second longitudinal margin of the vane material is welded to the second sheet of sheer material 14 on its second face, the vane would be s-shaped. This would require a redesign of the first folder to include an s-shaped channel.

Additionally, the equipment can be modified to dispense an adhesive to the vanes and or sheet materials instead of using welding stations. Similarly, the welding stations could be replaced with a sewing operation to stitch the vanes to the first and second sheets of sheer materials. It is also possible to weld one side of the vane to one of the first or second sheet of sheer material, and use adhesive or thread to attached to the other of the first and second sheet of sheer material. Any combination of welding, adhesive, and thread are possible and can be used to attach the vanes to the first and second sheets of sheer material while processing the vane material and first and second sheets of sheer material with the method and apparatus described herein. Of course the welders would need to be replaced with appropriate adhesive dispensers and sewing equipment if an adhesive or thread is to be used for attachment of the vane material. Further, the u-shaped or s-shaped vane could include a crease proximate one of the longitudinal edges that is set in the heat setting station or the temperature and pressure could be set so as to not form a permanent crease in the vane material. The u-shaped vane in the final light-control window covering could either be upright such that the longitudinal edges face upward, or could be inverted such that the longitudinal edges face downward.

Additionally, the shifting of the material could be before or after the welded structure is threaded through the nip rollers. If the welded structure is pressed between the nip rollers before the first and second sheer sheets have been shifted, a crease may form in the middle of the center region of the vane material. It may be possible to remove this crease in the heat setting station.

Further, the anvils used could include a single, double or triple stitch weld pattern, or could encompass a more fanciful pattern. While the exemplary embodiment is for the fabrication of a horizontal light-control window covering, the welded product could also be formed into a vertical light-control window covering, in which the vanes would extend in a vertical orientation in a window opening. For a vertical light-control window covering, the width of the welded structure would be the greatest width of the vertical light-control window covering, while the length would be determined by the length of the welded structure on the take up spool. While the hardware for mounting the light-control window covering has not been discussed, one skilled in the art could use any of the various headrails and mechanisms available to raise and lower, or open and close, the light-control window covering, as well as to move the light-control window covering from a light-passing to a light-blocking position.

Figures 20, 20A:
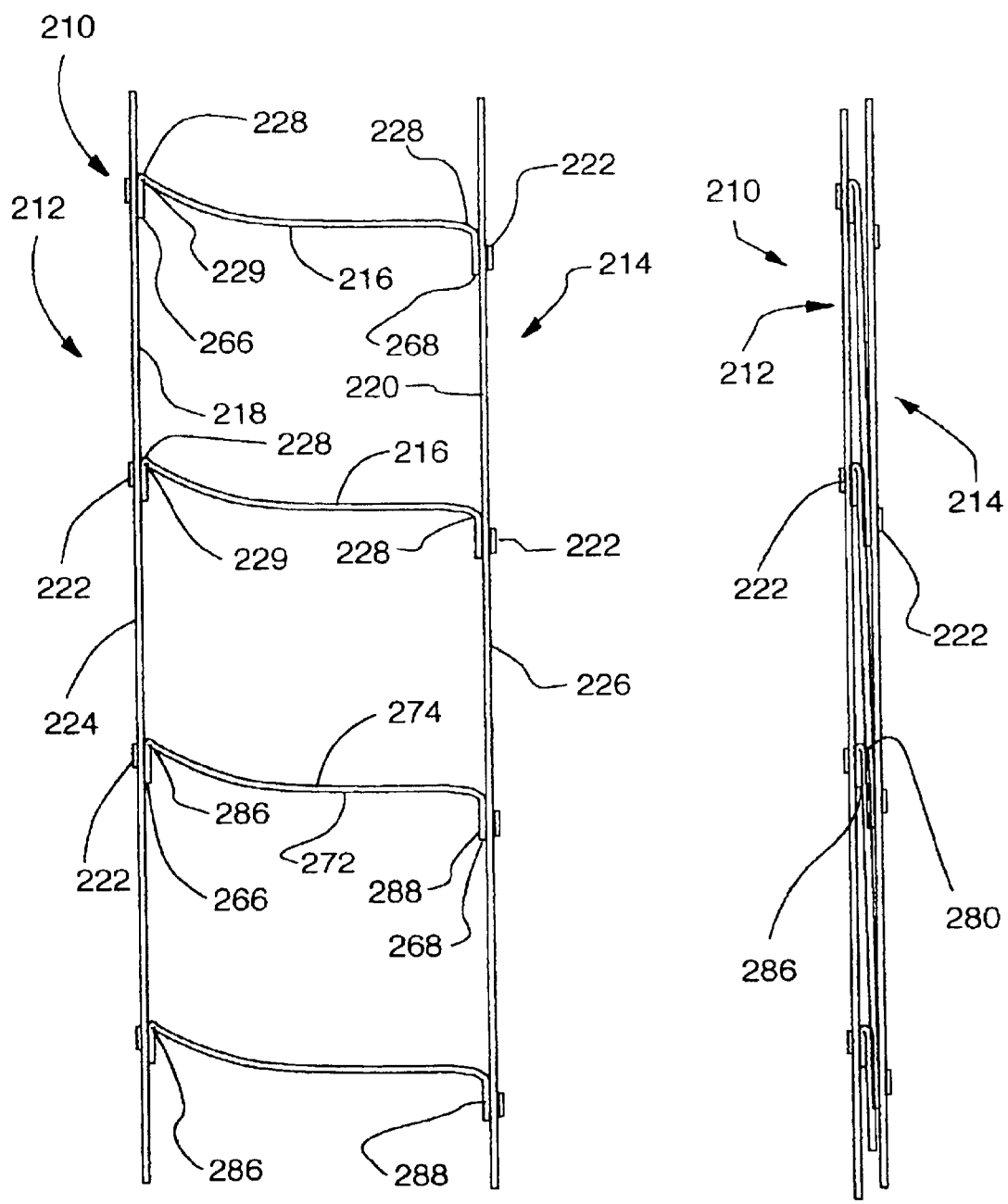
FIG. 20 is a cross-sectional view of another light-control window covering in a light-passing position.
FIG. 20A is a cross-sectional view of the light-control window covering of FIG. 20 in the fully light-blocking position.

Turning now to FIGS. 20–34 a further embodiment of a light-control product, and an apparatus and method for its manufacture are described. Referring to FIG. 20, an alternative embodiment of a light-control window covering 210 is illustrated. Light-control window covering 210 includes a first sheer material 212 and a second sheer material 214. A plurality of vanes 216 extend between the first and second sheer materials 212, 214. The vanes 216 are secured to a first or inner face 218, 220 of the first and second sheer materials 212, 214. A plurality of ribbons 222 are secured to the second or outer face 224, 226 of the sheer materials 212, 214 proximate each vane 216. Each vane 216 includes two lines of perforations 228 extending along the length of the vanes proximate the first and second sheer materials 212, 214, respectively. Additionally, each vane 216 includes at least one crease 229 proximate one of the lines of perforations 228.

The light-control covering 210 overcomes a number of problems with the prior art. Specifically, the ribbons 222 provide increased strength to the attachment between the vanes 216 and the first and second sheer materials 212, 214. Additionally, the ribbon 222 may include a matt finish that does not result in a glossy appearance that can occur with an adhesive bond. The ribbon 222 may also include a printed or embossed pattern that blends in with the sheer materials. The ribbons 222 provide a strengthened attachment between the vanes and the sheer materials without the problems of yellowing and glossing associated with adhesive. The perforations 228 allow the center portion of each vane 216 to be flattened providing a greater viewing area when the light-control window covering is in the light-passing position as illustrated in FIG. 20. Additionally, the perforations 228 reduce the amount of force required to move the light-control window covering 210 from the light-passing position to the light-blocking position illustrated in FIG. 20A. The perforations 288 also eliminate the tendency to bias vanes to the light-blocking position.

As will be described below in further detail, the ribbons 222 provide additional strength to the connection of the vanes 216 to the sheer materials 212, 214. The perforations 228 provide a line about which the vane may pivot or bend. The perforations 228 allow the center portion of the vane to be flattened in the light-passing position illustrated in FIG. 20. This flattened position of the center portion of the vane provides a see through area that is greater than the see through area of a prior art light-control product where the center portion of the vane is not flattened. By altering the location of the perforations on the vane, it is possible to alter the cross section of the vanes 216 when the light-control window covering 210 is in the light-passing position. The crease 229 also provides for a flattened center portion of the vane as illustrated in FIG. 20C. The crease 229 also serves to hide the weld of margin 286 to sheer material 212 when viewed through sheer material 214.

Figure 21:
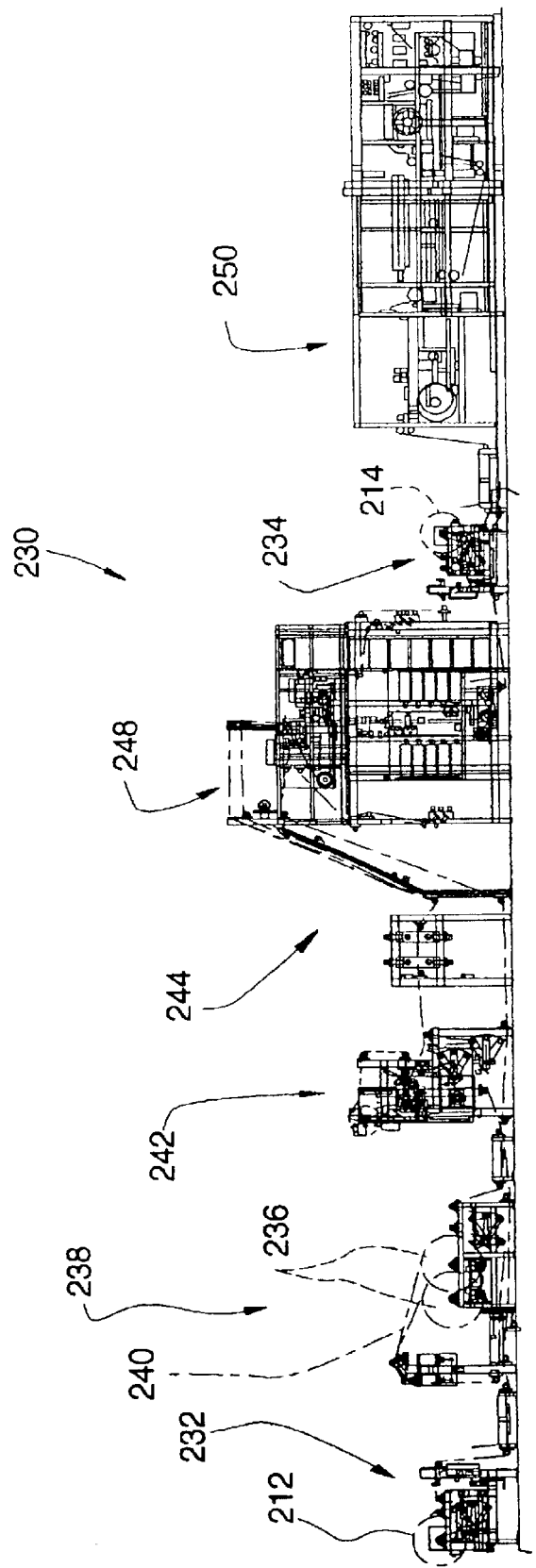
FIG. 21 is a side view of another embodiment of an apparatus for manufacturing a light-control window covering.

FIG. 21 illustrates an apparatus 230 for manufacturing the light-control covering 210. The apparatus 230 includes a number of stations and components that are similar to apparatus 32. However, in order to avoid confusion the components of apparatus 230 described herein will be identified with a distinct reference numeral. The features of apparatus 230 may be used with the various components described with respect to apparatus 32.

Apparatus 230 includes a first sheer material feeding station 232 for feeding a sheet for the first sheer material 212 and a second sheer material feeding station 234 for feeding a sheet for the second sheer material 214. The first and second sheer materials 212, 214 are each fed from a single roll of material, and have a width that forms the length of the light-control window covering 210 (with the vanes 216 in a horizontal orientation). The direction that the width of the first and second materials extend defines the cross direction of the apparatus 230.

The individual vanes 216 are formed from first and second rolls 236 of the vane material 240 that are fed from the vane material feeding station 238. The vane material 240 is slit and perforated in a vane slitting and perforating station 242 to form individual vanes 216 having two lines of perforations 228. The slitting of the vanes from only one or two rolls of material make it possible to reduce scrap when there is a defect in one of the rolls. A knitting defect in the rolls of vane material will be all the way across the fabric. With simultaneous vane insertion any defect will appear in the same place in the finished light-control covering making any defect easier to spot and remove by inspectors. In contrast single vane production and insertion may result in defects being randomly disposed within the final light-control product resulting in a greater scrap rate.

Each vane 216 is positioned in a vane repositioning station 244 and then welded to the first and second sheer materials 212, 214 in a welding station 248. A plurality of ribbons 222 are provided on a plurality of rolls 246 attached to the welding station 248. Each ribbon 222 is welded to a respective outer face 224, 226 of the first and second sheer materials 212, 214 proximate vanes 216 in welding station 248. Preferably, the ribbons 222, vanes 216 and first and second sheer materials 212, 214 are simultaneously welded together in upper and lower welders 296, 298.

Stresses in the welded together ribbons 222, vanes 216 and first and second sheer materials 212, 214 that occur during the welding process are relieved in a stress relief station 250 described in commonly assigned co-pending patent application Ser. No. 09/887,966 filed Jun. 22, 2001, which is incorporated herein by reference.

The apparatus 230, its operation and the resulting window covering 210 will now be described in further detail. Referring again to FIG. 21, the first and second sheer materials 212, 214 are fed to the welding station 248 from opposite directions. For description purposes, the first end or "upstream" direction of the welding station 248 is defined by the first sheer material feeding station 232 and the second end or "downstream" direction of the welding station is defined by the stress relief station 250. Accordingly, the first sheer material feeding station 232 is located on the upstream side of the welding station 248, while the second sheer material feeding station 234 is located on the downstream side of the welding station 248.

Both the first and second sheer materials 212, 214 are fed into the welding station 248 in a vertically downward position such that the inner faces 218, 220 of the first and second sheer materials 212, 214 are facing one another. Further, in the vertically downward position the outer face 224 of the first sheer material 212 faces upstream, while the outer face 226 of the second sheer material 214 faces downstream. The first and second sheer materials 212, 214 are fed through the welding station 248 such that the inner faces 218, 220 are a predetermined distance from one another. The predetermined distance is substantially the same distance as the distance that the first and second sheer materials 212, 214 will be apart from one another when the finished window covering is in the light-passing position as illustrated in FIG. 20.

Figure 21A:
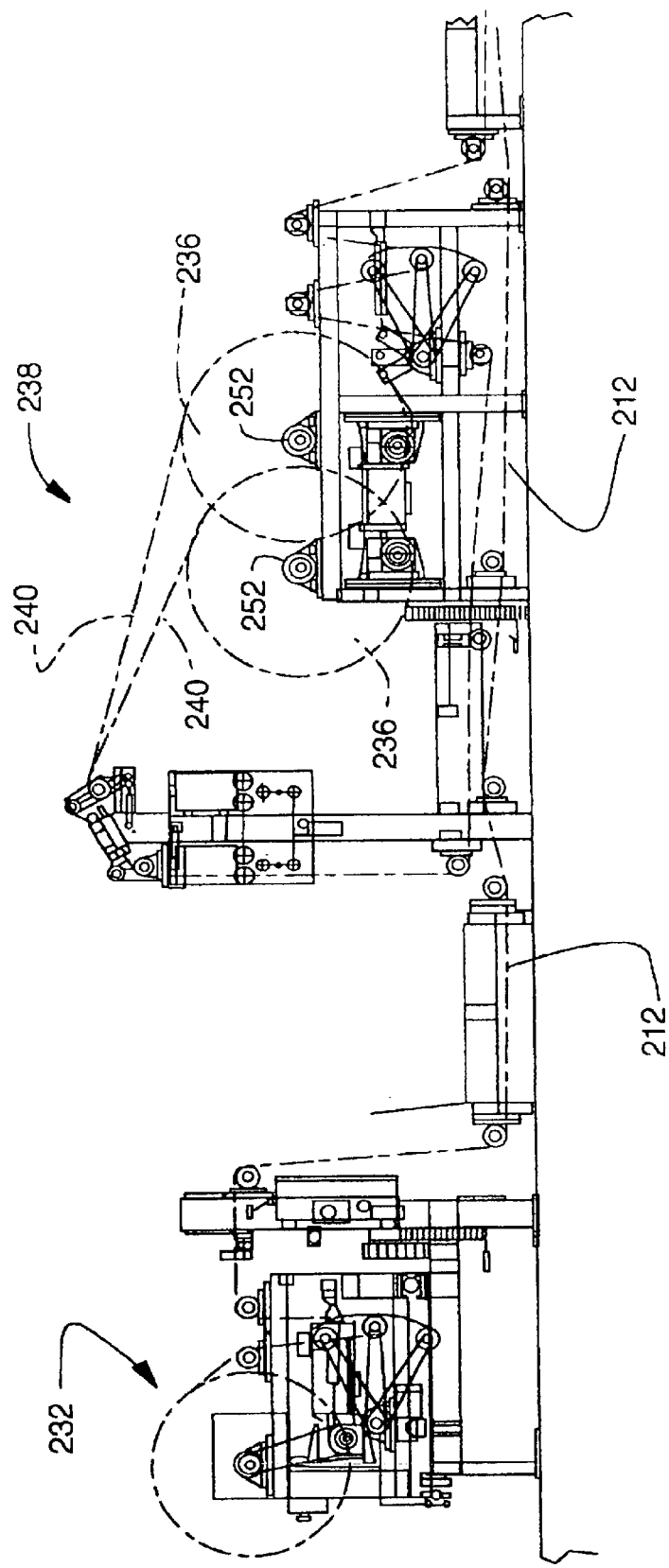
FIG. 21A is a side view of the first sheer material feeding station and vane feeding station of FIG. 21.
Figure 21B:
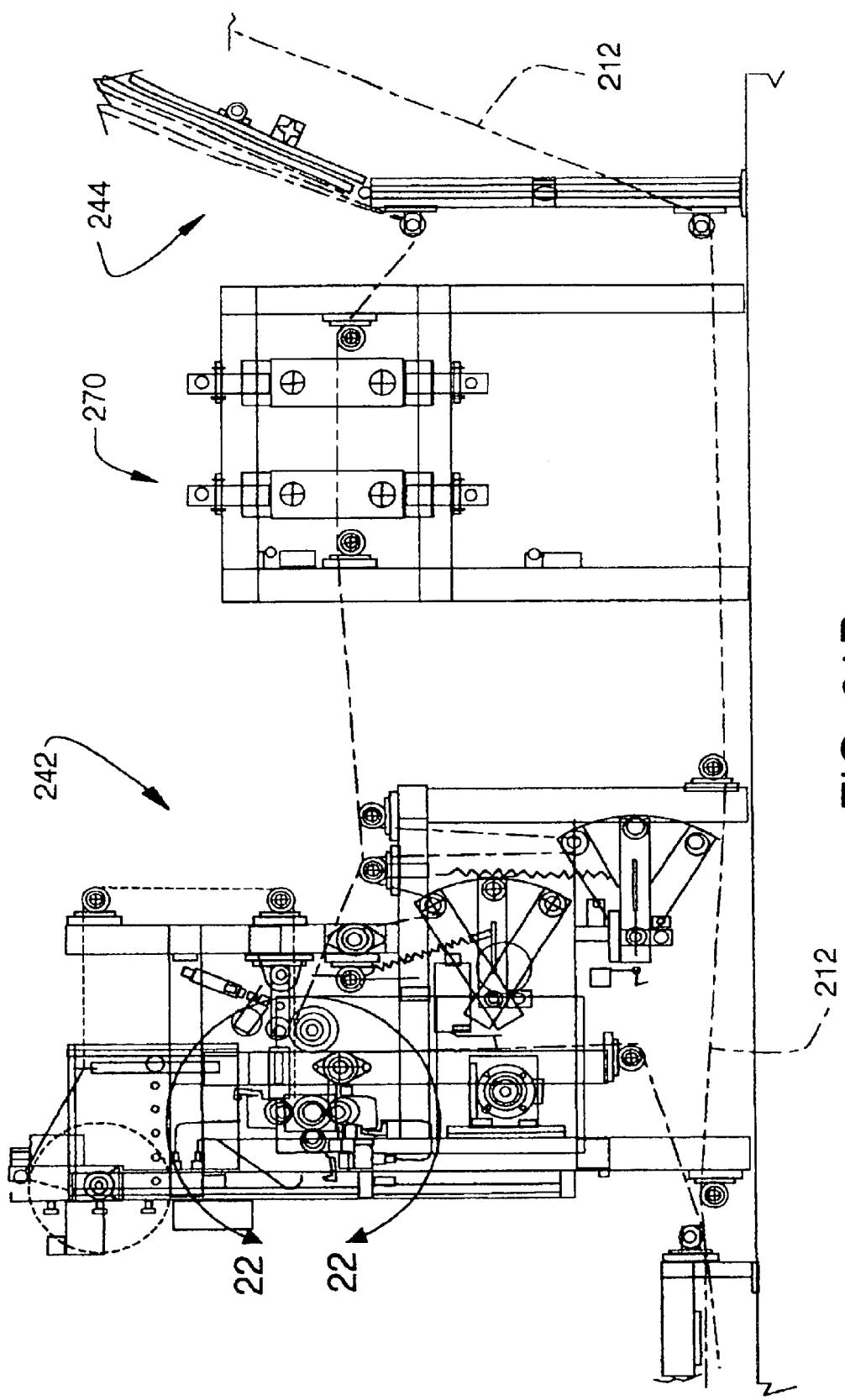
FIG. 21B is side view of the vane slitting and perforating station and vacuum station of FIG. 21.
Figure 21C:
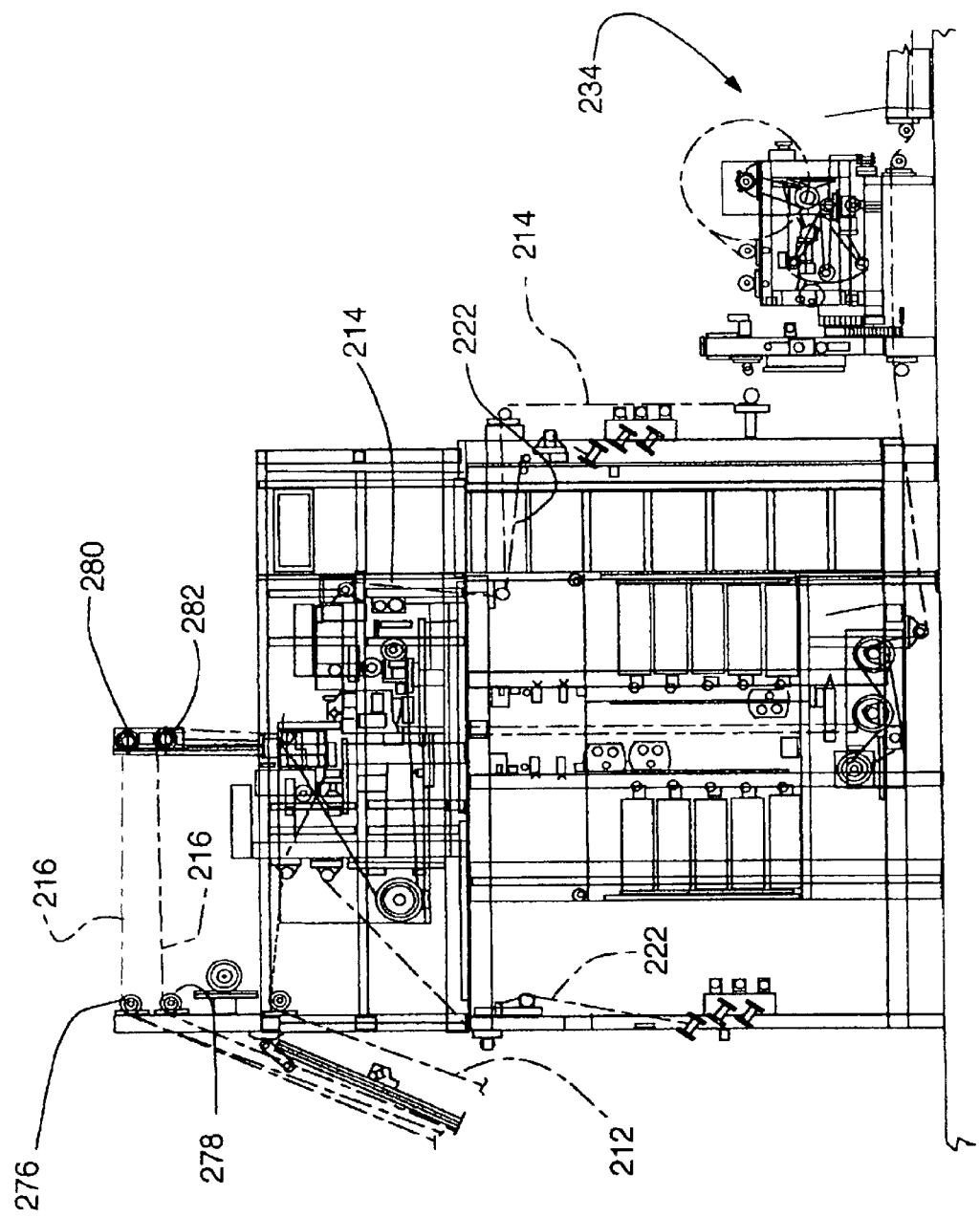
FIG. 21C is a side view of the ribbon feeding and welding station of FIG. 21.

Referring to FIGS. 21A–21C, the first sheer material 212 is fed from first sheer material feeding station 232 and passed under the vane material feeding station 238, under the vane slitting and perforation station 242 and further under the vane repositioning station 244. The first sheer material 212 is then fed upward over the ribbons 222. The first sheer material 212 is fed over a plurality of rollers such that the first sheer material 212 is fed to the welders in a downward position. As discussed above, in this downward position, the outer face 224 of the first sheer material 212 faces toward the first end of the apparatus 230, and the inner face 218 faces away from the first end of the apparatus 230 and toward the second end of the apparatus 230.

As illustrated in FIG. 21C the second sheer material 214 is fed from the second sheer material feeding station 234, which is positioned on the second or downstream side of the welding station 248. The second sheer material 214 is fed over a plurality of rollers to the welding station 248 such that the second sheer material 214 is in a downward position. In this downward position the inner face 220 faces toward the first end of the apparatus 230 and towards the inner face 218 of the first sheer material 212.

As illustrated in FIG. 21A, vane material feeding station 238 includes two spindles 252 for rotatably supporting two separate rolls of vane material 240. Each roll of vane material is located side by side in the cross machine direction. While it is possible to have a single roll of vane material, the use of two rolls of vane material provides for easier material handling. Vane material 240 is fed via a plurality of rollers first toward the first end of the apparatus 230 and then back under the vane feeding station 238 toward the vane slitting and perforating station 242. The vane material 240 is located above the first sheer material 212 as it passes back under the vane material feeding station 238.

Figure 24:
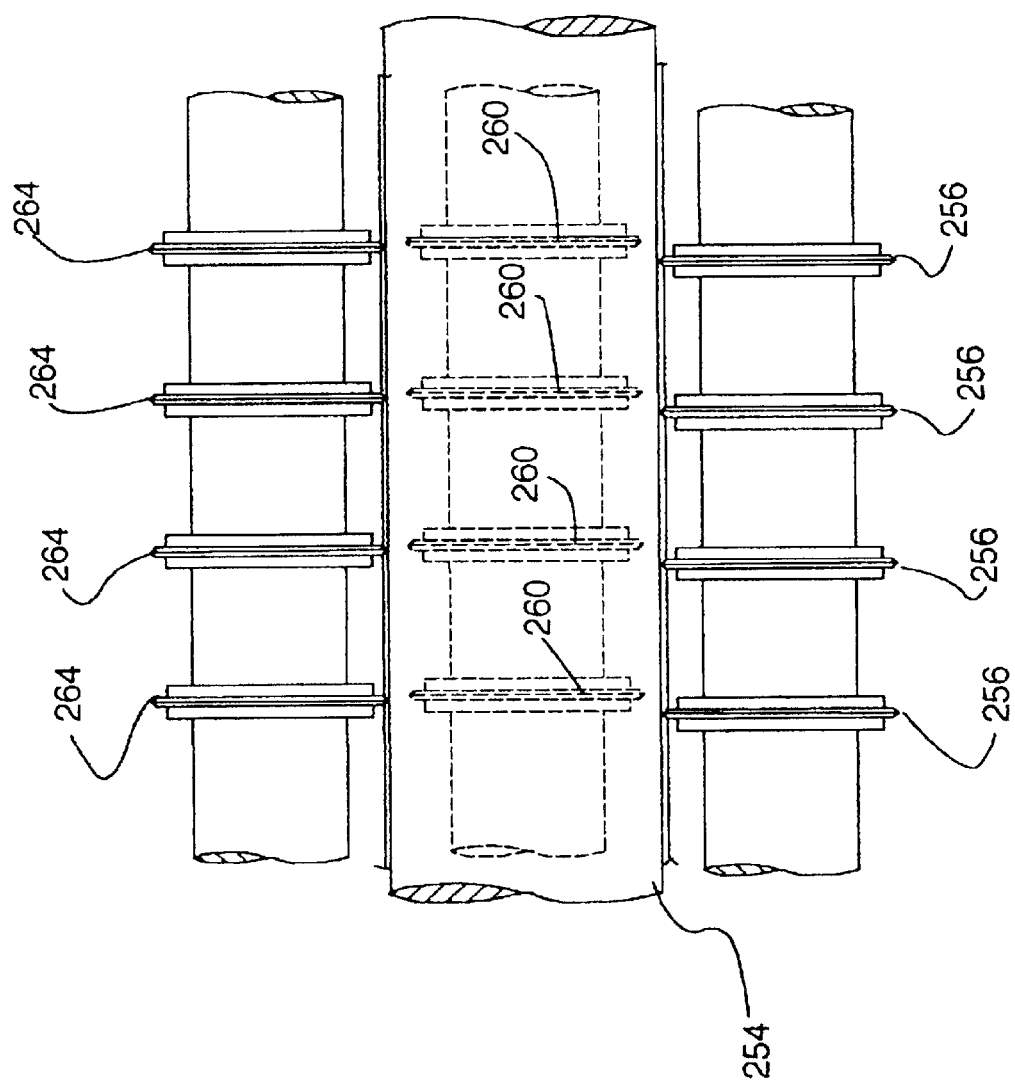
FIG. 24 is a partial plan view of the perforation and slitting station.

Vane material 240 is slit into a plurality of continuous vanes 216 in the vane slitting and perforating station 242. In the exemplary embodiment, each roll of vane material 290 is slit into thirty vanes each having a width of about 2.10 inches. Of course, it is possible to slit the vane material 240 into more or less than thirty vanes having a width other than about 2.10 inches. As illustrated in FIGS. 21B, 22 and 24, the vane material 240 is passed around a cutting roller 254. The vane material 240 is first perforated in a plurality of continuous spaced lines by a first set of perforating wheels 256. The first set of perforating wheels 256 is located directly below the cutting roller 254. Each perforating wheel 256 presses the vane material 240 against the cutting roller 254. As illustrated in FIG. 24, each perforating wheel 256 includes a plurality of raised knife portions or teeth 258 that perforate the vane material 240, leaving a plurality of slits that are about 5/1000 of an inch long and extending through the vane material 240. The distance between each slit is about 8/1000 of an inch. The length of the slit and the distance between the slits may be varied by changing the geometry of the perforating wheels 256 and teeth 258.

A second set of perforating wheels 260 is located on the upstream side of the cutting roller 254. Each perforating wheel 260 is offset laterally a predetermined distance from each respective first perforating wheel 256. Each perforating wheel 260 includes a plurality of raised cutting portions or teeth 262. In the preferred embodiment, the first set and second set of perforating wheels 256, 260 are identical. According to alternative embodiments, it is possible to modify the geometry of the raised cutting portion 262 to provide a length of the slit and distance between adjacent slits that is different then that created by the first perforating wheel 256.

A plurality of cutting or slitting knives 264 are rotatably located on the top of the cutting roller 254. As illustrated schematically in FIGS. 28 and 29, each slitting knife 264 is located laterally between a respective first perforating wheel 256 and second perforating wheel 260. As the vane material 240 is fed through the slitting knives 264 and the first and second perforating wheels 256, 260, a plurality of continuous vanes 216 are formed. Each vane 216 includes a first and second edge 266, 268 formed by adjacent slitting knives 264 and first and second lines of the perforations 228 extending parallel to and located a predetermined distance from each respective first and second edge 266, 268.

In the preferred embodiment, each line of the perforations 228 is located 0.1875 inch from the respective first and second edges 266, 268. According to an alternative embodiment, the lines of perforations may be between 0.125 and 0.250 inches from the respective edges. The perforations 228 in the exemplary embodiment include a plurality of slits extending through the material in a single line, it is also possible to provide for a number of parallel lines of perforations proximate each margin of the vanes. The slits of each line could be the same or different length as the other lines and/or the slits could be offset from the slits in the other lines. Additionally, the perforations could have a different geometry such as a circle or oval or any other shape. Further, it is possible to have different types of perforations in the same line by changing the geometry of the raised portions about the perforating wheel.

After the vane material 240 is slit and perforated, the plurality of vanes 216 are disposed side by side as illustrated in FIG. 10. Any dust that forms as a result of the slitting and perforating of the vane material is vacuumed in vacuum station 270. The vacuum station 270 ensures that the amount of dust on the vanes is minimized as the vanes are presented to the welding station 248.

Figure 25:
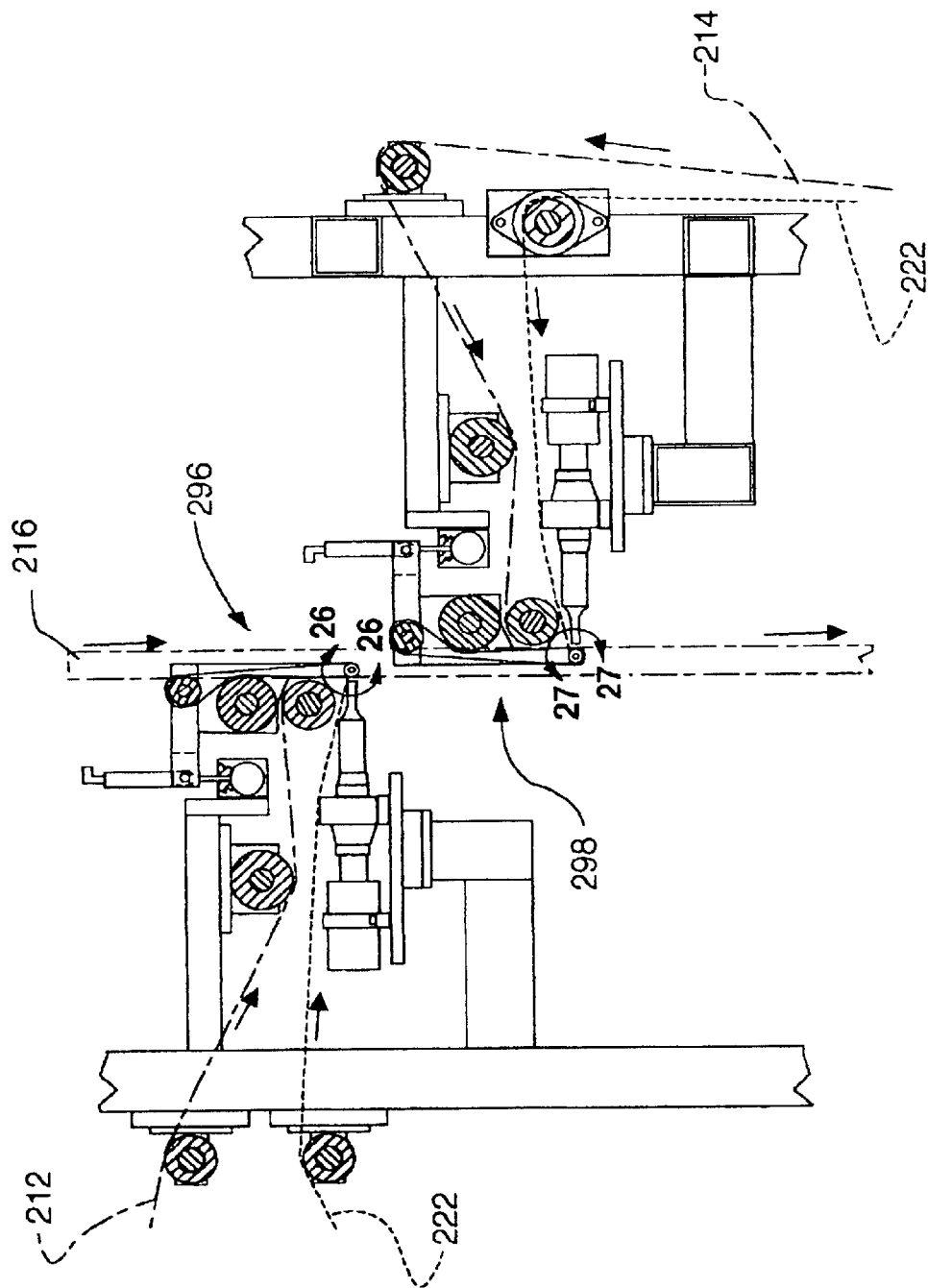
FIG. 25 is fragmentary side view of the welding station of FIG. 21C.

Each vane 216 is presented in the welding station 248 in a downward extending direction such that a first face 272 of the vanes 216 is facing the front of the apparatus 230 and the second face 274 of the vanes is facing the back of the apparatus 230 in a U-shaped configuration. The vanes 216 are repositioned from the side-by-side orientation illustrated in FIG. 29, in which the first face 272 of the vanes 216 are facing upwards and are in the same plane, to a downward direction as illustrated in FIG. 25 in which the first face 272 of the vanes are facing frontward and are in separate but parallel planes.

Figure 30:
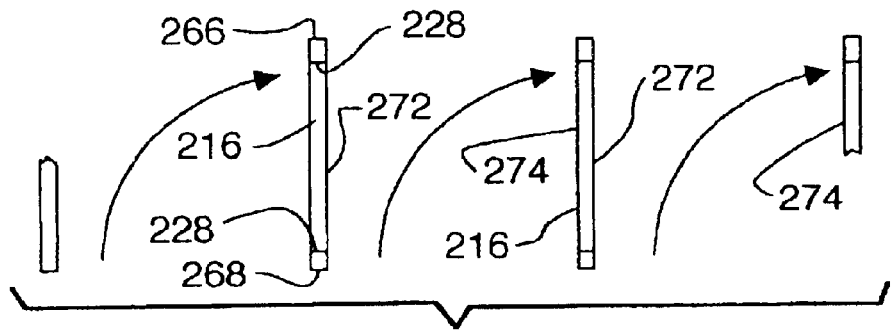
FIG. 30 is a schematic view of the slit and perforated vanes being rotated ninety degrees.
Figure 31:
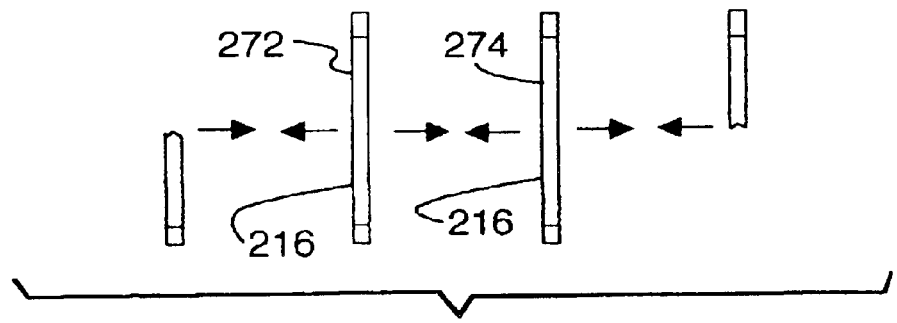
FIG. 31 is a schematic view of the slit and perforated vanes being moved closer to one another after being rotated ninety degrees.

The continuous vanes 216 are first rotated ninety degrees as illustrated in FIG. 30 such that the first face 272 of vanes 216 is facing the opposite or second face 274 of an adjacent vane 216. The vanes are moved toward one another laterally as illustrated in FIG. 31 such that the distance between the faces 272, 274 of each adjacent vane 216 is decreased. In an exemplary embodiment the vanes 216 are moved from about 2.10 inches apart to within about 1.625 inches apart.

In order to re-position the vanes to be presented to the welder in a downward extending direction, adjacent vanes are alternately passed over either an upper or lower rubber coated roller 276, 278. The vanes 216 are twisted back to a horizontal position in which the first face 272 of each vane 216 is parallel to the ground. Because the vanes 216 are only about 1.625 inches apart (as measured from the center of the vanes), the vanes would overlap if they were all passed over a single roller. This is avoided by alternately passing the vanes 216 over the upper and lower rubber coated rollers 276, 278. The vanes 216 are directed downward toward the welders by passing over a second sets of upper and lower rubber coated rollers 280, 282. The rubber coating on the first and second sets of upper and lower rollers 276, 278, 280, 282 aids in applying tension to the vanes as they are fed into the welding station. The faces of adjacent vanes 216 remain about 1.625 inches from one another as the vanes 216 are directed downward into the welding station 248.

Figure 33:
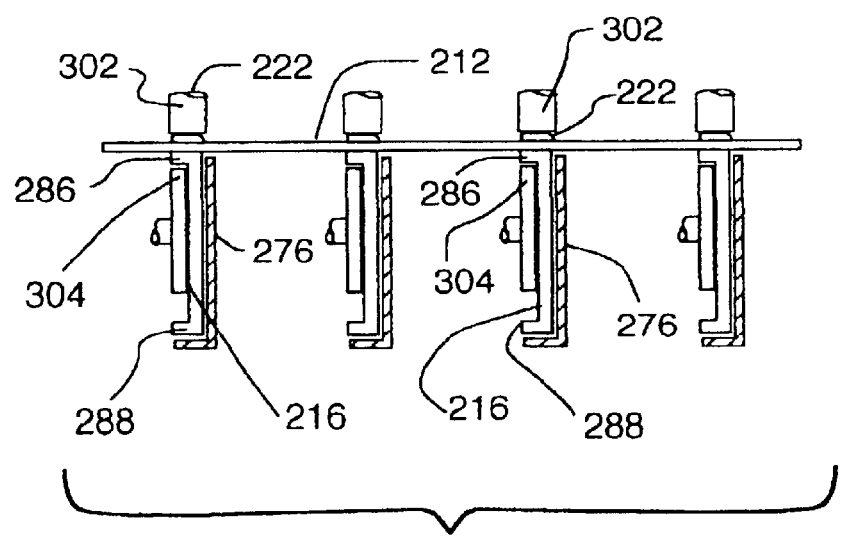
FIG. 33 is a partial cross-sectional view of the vanes in the first welding station.
Figure 34:
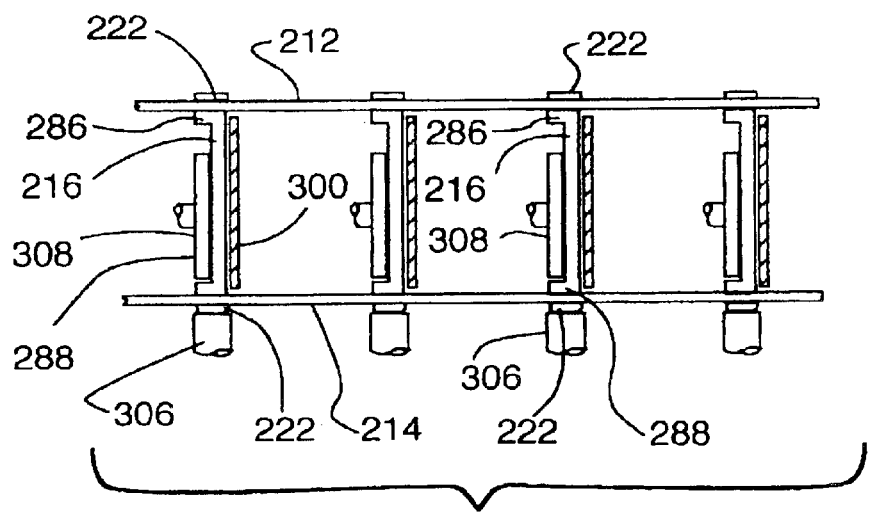
FIG. 34 is a partial cross-sectional view of the vanes in the second welding station.

Each vane 216 is fed into a respective first or upper folder or chute 284, such that a first margin 286 proximate the first edge 266 is folded substantially perpendicular to a center portion 299 of the vane 216. Similarly, a second margin 288 proximate the second edge 268 is also folded substantially perpendicular to the center portion of the vane 216. In the exemplary embodiment, the first and second margins 286, 288 extend from the center portion of the vane in the same direction. The first and second margins 286, 288 are positioned parallel to the inner faces 218, 220 of the first and second sheer materials 212, 214 respectively. In this position (as illustrated in FIGS. 25, 33 and 34), the vanes 216 are welded to the first and second sheer materials 212, 214. In one exemplary embodiment, the first and second margins 286, 288 are folded such that the vane 216 has a U-shape where one face of the vane 216 is contacting both the first and second sheer materials 212, 214.

As noted above, a plurality of ribbons 222 are welded to the outer faces 224, 226 of the first and second sheer materials 212, 214 proximate the first and second margins 286, 288 of the vanes 216. The ribbons 222 are fed from a plurality of rolls of ribbon material 246 rotatably secured to both the upstream and downstream sides of the welding station 248. Each ribbon material 246 is formed from a polyester film material three mils thick and having a width of about 0.093 inches. According to alternative embodiments, the ribbon may be thinner so long as it provides sufficient material to increase the weled strength and/or enhance the appearance of the weld. In one embodiment the ribbons 222 may range between about 1 mil and about 20 mils. Each ribbon includes a first or outer face 290 and a second or inner face 292. The outer face 290 may include an anti-static coating and/or a matt finish. In one embodiment, the ribbon includes a matting agent such as a high temperature urethane is used to reduce the gloss. In another embodiment, a thermoset acrylic coating may also be applied to the ribbon or other polyester matting agents could be used. The ribbon coating material in an exemplary embodiment may be the material supplied by Dunmore under item No. "300 Dun-Kote Matt Polyester 683 CITC." It may also be possible to print on the outer face 290 of the ribbon to provide either color or a desired pattern. In one exemplary embodiment the ribbon 222 is transparent and clear so that the ribbon 222 does not hide the color of the sheer material 212, 214 and vanes 216. It is also possible to add color to the ribbon 222 so that the first and second margins 286, 288 of the vanes 216 welded to the first and second sheer materials 212, 214 are at least partially covered or hidden by the ribbon material 246. The ribbon 222 may also have a color tint, so that the ribbon 222 is still transparent. Further, the ribbon 222 may include color such that the ribbon 222 is opaque. The ribbons 222 may be formed from other types of materials that may be welded with the sheer material and vane material to provide additional strength to the light-control product. For example the ribbons 222 may be formed from polyester braided ribbon or thin strips of center vane material.

Each ribbon material 246 is fed from the rolls over a plurality of rollers and presented to the welding station 248 by a ribbon feeder 294 proximate a respective upper or lower welder 296, 298. Each ribbon is fed to respective upper or lower welder 296, 298 such that the outer face 290 of each ribbon 222 is adjacent the outer faces 224, 226, respectively, of the first and second sheer materials 212, 214.

Figure 32:
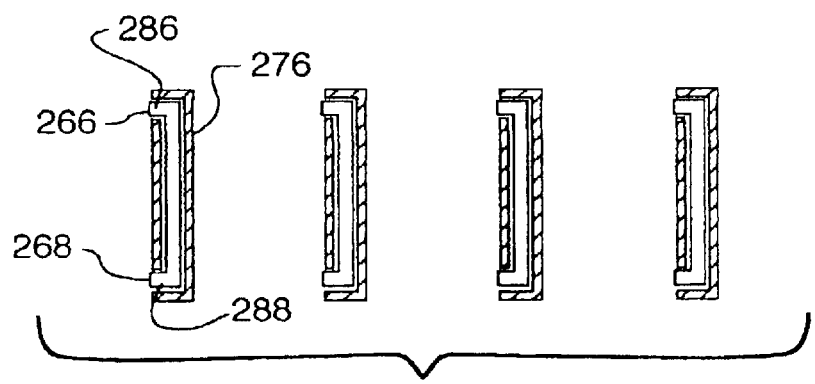
FIG. 32 is a partial cross-sectional view of the vanes in the welding chutes.

The upper and lower welders 296, 298, as well as the upper and lower folders 284, 300, operate substantially in the same way as the welders and folders discussed above with respect to apparatus 32. The upper folders 284 guide each respective vane 216 into a U-shaped configuration with the first and second margins 286, 288 perpendicular to and extending the same direction from the front face of the vane 216. In addition to folding the margins relative to the front face of the vane, the upper folder 284 also serves to center the vane material. The position of the vane in the upper portion of the upper folder 284 is illustrated in FIG. 32.

The upper portion of the upper folder 284 includes a U-shaped channel that positions the vane material in a U-shaped configuration prior to welding the first margin 286 of each vane 216 to the first sheer material 212 and to a respective ribbon 222. The lower portion of the upper folder 284 is schematically shown in FIG. 33 in which the first margin is located in the upper welder 296. The first margin 286 is adjacent the inner face 218 of the first sheer material 212 such that the center of the vane 216 is perpendicular to both the first margin 286 and the inner face 218 of the first sheer material 212. The ribbon 222 is fed to the upper welder 296 such that the inner face 290 of the ribbon 222 is located proximate the outer face 224 of the first sheer material 212 opposite the first margin 286 of the vane 216.

Figure 26:
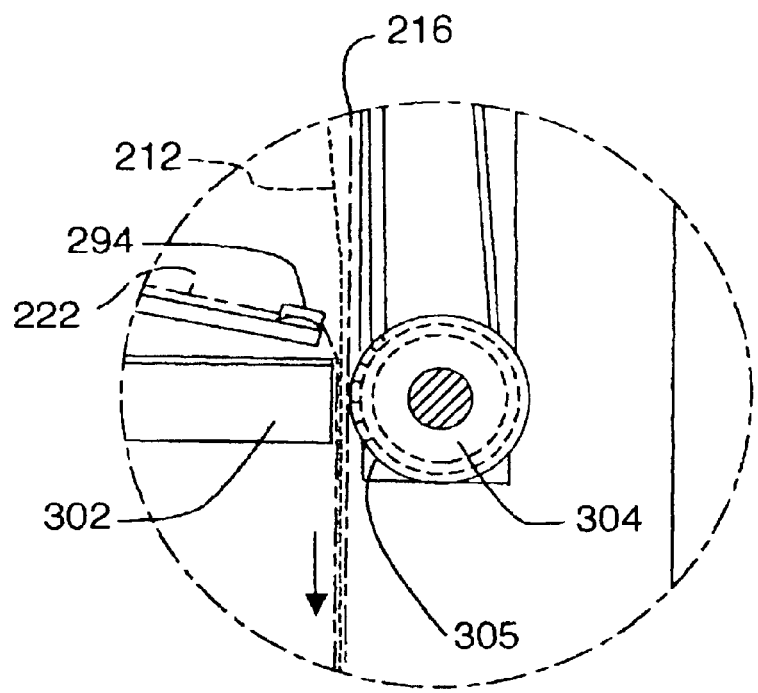
FIG. 26 is a partial view of a first welder of the welding station taken generally along lines 26—26 of FIG. 25.

In this orientation, the ribbon 222, first sheer material 212 and vane 216 are fed through a horn 302 and a rotary anvil 304 of the upper welder 296. The upper welder 296 ultrasonically stitch welds the three materials together. As illustrated in FIG. 26, the rotary anvil 304 includes a plurality of raised portions or teeth 305 that contact and press against the first margin 286 of the vane 216. The rotary anvil 304 presses the first margin 286 of the vane 216, first sheer material 212 and ribbon 222 against the horn 302. As discussed above with respect to apparatus 32, the upper welder 296 stitch welds the ribbon 222, first sheer material 212 and first margin 286 together, with the first sheer material 212 located between the ribbon 222 and the vane 216. The ribbon 222 provides additional structure to the weld between the first sheer material 212 and the first margin 286 of the vane 216. The additional material provides greater strength to the weld between the vanes 216 and sheer material. The weld results in a melting of the ribbon, first sheer material and vane materials in the location of the weld.

The welded together first set of ribbons 222, first margins 286 of the vanes 216 and the first sheer material 212 is then fed into the lower folders 300 along with the second margin 288 of the vanes 216 as illustrated in FIG. 34. Each lower folder 300 includes an upper portion having an L-shaped region to bend the second margin 280 perpendicular to the center region of the vane 216. Since the first margin 286 is already welded to the first sheer material 212, additional support is not required to maintain the correct position of the first margin 286. As the vane 216 exits the lower folder 300, the second margin 288 of the vane 216 is adjacent a second rotating anvil 306 of the lower welders 298. As discussed above with respect to the upper welder 296, a plurality of ribbons 222 are fed to the bottom portion of the lower folder 300 with a ribbon feeder 307 such that the second set of the ribbons 222 are fed to lower welder 298 with the inner face 290 of the ribbon 222 located proximate the outer face 226 of the second sheer material 214 opposite the second margin 288 of the vane 216.

Figure 27:
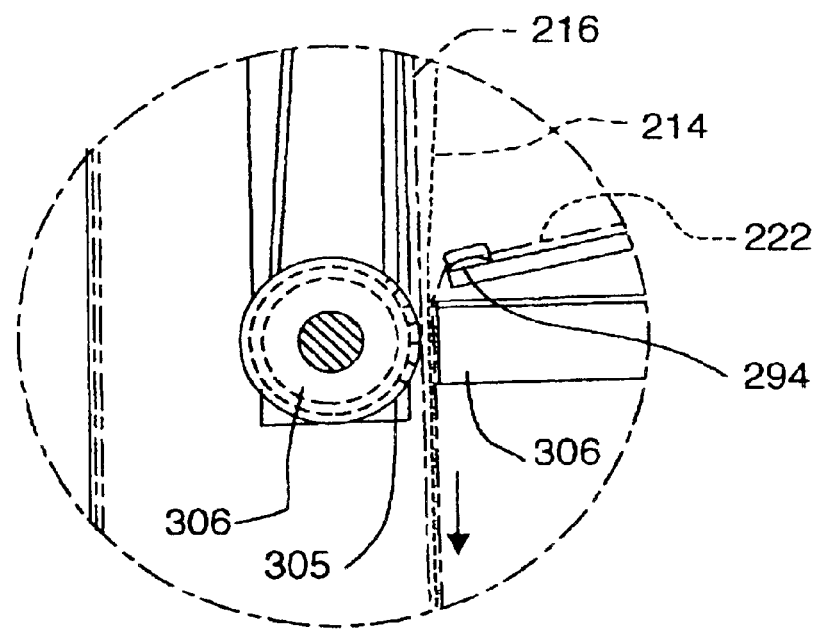
FIG. 27 is a partial view of a second welder of the welding station taken generally along lines 27—27 of FIG. 25.
Figure 28:
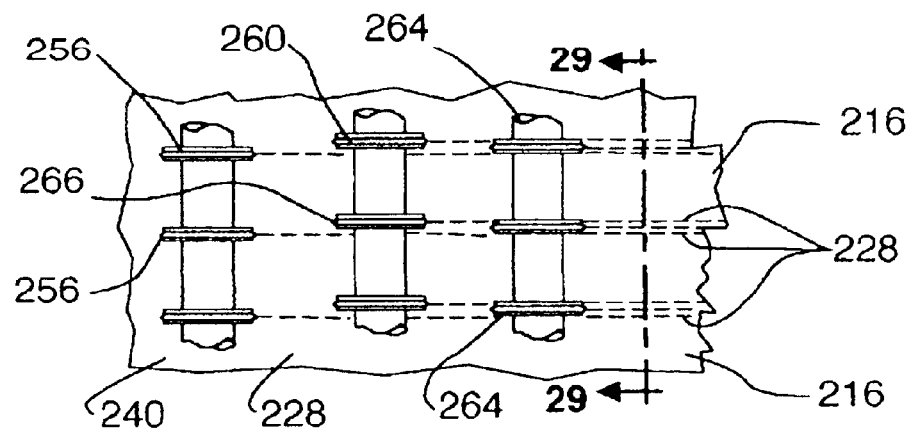
FIG. 28 is partial schematic view of the perforation and slitting station of FIG. 21B.
Figure 29:
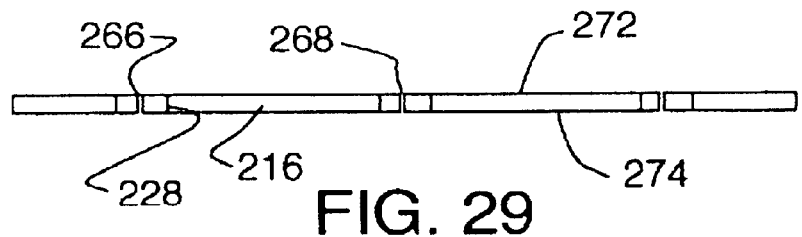
FIG. 29 is a schematic view of the vanes cut and slit taken generally along lines 29—29 of FIG. 28.

In this orientation, the ribbon 222, second sheer material 214 and second margin 288 of the vane 216 are fed through a horn 308 and rotary anvil 306 of the lower welder 298. The lower welder 298 ultrasonically welds the three materials together. As illustrated in FIG. 27, the rotary anvil 306 includes a plurality of raised portions or teeth 305 that contact and press against the second margin 288 of the vane 216. The rotary anvil 306 presses the second margin 288 of the vane 216, second sheer material 214 and respective ribbon 222 against the horn 308, thereby welding the materials together.

As the materials exit the lower welder 298, the light-control covering material is fully welded together. The first and second sheer materials 212, 214 are shifted relative to one another in the cross machine direction prior to being fed about a lower roller 310. The movement of first and second sheer materials 212, 214 results in front faces of the vanes 216 moving from a substantially parallel relationship to substantially the same plane. The first margins 286 are bent approximately 180 degrees about the first line of perforations 228 relative to the of the vanes 216, while the second margin 288 is in substantially the same plane as the center portion of the vanes 216. The welded materials are moved from the light-passing position to a light-blocking position as discussed above. In this light-blocking or closed position, the welded materials are forwarded to the stress relief station.

A crease 229 may be imparted to the vanes in the stress relief station. In an exemplary embodiment, the crease is formed at or close to one of the lines of perforations proximate the first longitudinal margin that is bent approximately 180 degrees when the light-control is the light-blocking position. However, the crease may be created either between the longitudinal margin and the respective line of perforations or between the line of perforations and the center of the vane material. Either a single crease may be made in the vane or two creases one proximate each longitudinal margin, with none, one or both of the creases falling on the line of perforations. Referring to FIG. 20 a crease 229 is formed proximate the line of perforations 228 adjacent sheer material 212.

Once the welded materials have been processed in the stress relief station 250, the welded materials are either wound about a roll for subsequent processing or cut into predetermined lengths for sizing and attachment to hardware.

Many of the components discussed above with respect to apparatus 32 may be used in conjunction with apparatus 230. A number of differences between apparatus 32 and apparatus 230 include the station for slitting and perforation of the vane material as well as the station for welding a ribbon onto the sheer materials. However, the basic mechanisms for ultrasonically welding remain the same. Similarly, the perforations 228 in the vanes 216 may also be used in conjunction with other methods for connecting the vanes to the sheer materials such as with adhesive, by sewing or any other type of mechanical or physical connecting device. While the introduction of a ribbon works well for an ultrasonic welding apparatus, the use of a ribbon to strengthen the connection between the vane and the sheer material is also applicable for other types of connectors.

A side view of the completed light-control window covering 210 in a light-passing position is illustrated in FIG. 20. The two lines of perforations 228 are positioned proximate a respective welded portion, but are not welded to the respective first or second sheer materials 212, 214 or ribbons 222. When first or second sheer materials 212, 214 are spaced apart from one another as illustrated in FIG. 20, the vanes 216 bend about the lines of perforations 228. This enables the center portions of the vane 216 to lay substantially horizontal and flat. The flattened nature of the vane 216 allows for a greater light-passing region. If the opaque vanes have a curvature, a greater amount of light will be blocked from passing through the window covering 210. As illustrated in FIG. 20B the crease 229 on the vanes 216 affects the shape of the vane. The crease 229 is maintained in the vane 216 even if the first and second sheer materials 212, 213 are moved relative to one another such that the non-creased side of the vane is raised above the side of the vane that has crease 229.

As illustrated in FIG. 20A, the light-control window covering 210 may be moved to a light-blocking position by shifting one sheer material vertically and inwardly relative to the other sheer material. In the exemplary embodiment, the first and second margins 286, 288 of the vanes 216 are secured to the first and second sheer materials 212, 214 on the same side of the vane 216. This results in a U-shaped configuration of the vanes. When the window covering 210 is moved to a light-blocking position the vane is folded over about crease 229 such that a center portion of the vane is adjacent the first margin. In contrast, the second margin lies in substantially the same plane as the center portion of the vane. The vanes bend about the lines of perforation 228 as the sheer materials are shifted relative to each other to move from a light-passing position to the light-blocking position and from the light-blocking positions to the light-passing position.

As illustrated in FIG. 20A a portion of each vane overlaps an adjacent vane to ensure that there is no area in which light can pass through without hitting a portion of a vane. The overlap is achieved by having the distance between the welds of adjacent vanes be less than the width of the vanes themselves. This overlap is accomplished by welding the vanes to the sheer materials in the open position such that the faces of the vanes are both offset in the cross machine direction as they are being welded.

Referring to FIGS. 20A–20F, the vanes may have a different shape as the vanes are moved from a light-blocking position illustrated in FIG. 20A to the light-passing position in FIGS. 20 and 20C to an over opening position illustrated in FIGS. 20E and 20F. Each of FIGS. 20A–20F show the shape of the vanes as the first and second sheets are moved relative to one another. Referring to FIG. 20B if sheer material 214 is facing inward toward the room the weld between margin 286 of the vane and the sheer material 212 is hidden by the vane itself. This minimizes the appearance of one of the welds since it is hidden from view. It is also possible to crease both sides of the vane proximate each line of perforations 228.

While the detailed drawings and specific examples describe exemplary embodiments of a light-control product, apparatus and method for its manufacture they serve the purpose of illustration only. For example, the vanes in the exemplary embodiment includes two lines of perforations, however, a single line of perforations may be used either proximate the first or second margins. Further modifications may be made in the design, arrangement and combination of the elements without departing from the scope of the invention as expressed in the appended claims.

What is claimed is:

1. A light-control window covering comprising: a first sheer material, a second sheer material; a plurality of vanes having perforations, each vane operatively connected to the first and second sheer materials; and a plurality of ribbons operatively connected to said first and second sheer materials proximate the vanes; and wherein each vane bends about the perforations as the first and second sheer materials are moved relative to one another.

2. The light-control window covering of claim 1, wherein the perforations form a longitudinally extending line proximate a longitudinal margin of the vanes.

3. The light-control window covering of claim 1, wherein the perforations includes two longitudinally extending lines of perforations, each line being proximate a respective longitudinally extending first and second margin of the vanes.

4. The light-control window covering of claim 1, wherein the vanes are ultrasonically welded to the first and second sheer materials.

5. The light-control window covering of claim 1, wherein each ribbon is operatively connected to a respective vane.

6. The light-control window covering of claim 5, wherein the ribbons are welded to the first and second sheer materials and to the vanes.

7. The light-control window covering of claim 6, wherein the first and second sheer materials each include a first face and an opposing second face, the vanes being adjacent the first face of the first and second sheer materials and the ribbons being adjacent the second face of the first and second sheer materials.

8. The light-control window covering of claim 1, wherein each perforation is a slit extending through each respective vane.

9. The light-control window covering of claim 8, wherein the distance between each perforation is greater than the length of each perforation.

10. A light-control window covering comprising: a first sheer material and a second sheer material spaced apart from the first sheer material, each sheer material having a first face and a second face; a plurality of vanes having a first and a second longitudinal margin, each longitudinal margin being adjacent the first face of the first and second sheer materials, respectively; and a plurality of ribbons adjacent the second face of at least one of the first and second sheer materials, each ribbon being ultrasonically welded to one of the first and second sheer materials and to a respective longitudinal margin of the vane.

11. The light-control window covering of claim 10, wherein each ribbon is formed from a thermoplastic material.

12. The light-control window covering of claim 10, wherein each ribbon is formed form a polyester material.

13. The light-control window covering of claim 12, wherein each ribbon is at least one mil thick.

14. The light-control window covering of claim 12, wherein each ribbon is between about one and about twenty mils thick.

15. The light-control window covering of claim 12, wherein each ribbon is about three mils thick.

16. The light-control window covering of claim 11, wherein each vane includes perforations.

17. The light-control window covering of claim 16, wherein the vanes are movable about the perforations between a light-passing position in which a center region of each vane is substantially perpendicular to the first and second sheets of sheer material, and a light-blocking position in which the center region of each vane is substantially parallel to the first and second sheer materials.

18. A light control window covering comprising:

a first sheer material;

a second sheer material; and a plurality of vanes having perforations, each vane operatively connected to the first and second sheer materials;

wherein each vane bends about the perforations as first and second sheer materials are moved relative to one another; and a plurality of ribbons operatively connected to at least one of the first and second sheer materials, each ribbon being operatively connected to a respective vane wherein the ribbons are welded to the first and second sheer materials and to the vanes and wherein the first and second sheer materials each include a first face and an opposing second face, the vanes being adjacent to the first face of the first and second sheer materials and the ribbons being adjacent to the second face of the first and second sheer materials, and further wherein each vane includes a first face and a second face, and a first and second longitudinal margin, the first face of each vane being welded to the first and second sheer materials along the respective first and second longitudinal margins.

19. A light control window covering comprising:

a first sheer material and a second sheer material spaced apart from the first sheer material, each sheer material having a first face and a second face;

a plurality of vanes having a first and a second longitudinal margin, each longitudinal margin being adjacent the first face of the first and second sheer materials respectively; and a plurality of ribbons adjacent the second face of at least one of the first and second sheer materials, each ribbon being ultrasonically welded to one of the first and second sheer materials and to a respective longitudinal margin of the vane;

each ribbon being formed from a thermoplastic material and wherein each vane includes perforations; and wherein the vanes are movable about the perforations between a light-passing position in which a center region of each vane is substantially perpendicular to the first and second sheets of sheer material, and a light-blocking position in which the center region of each vane is substantially parallel to the first and second sheer materials; and wherein the vanes are ultrasonically welded to the first and second sheets of sheer material along a first face of the vanes, the second longitudinal margin of each vane being folded over and adjacent the center region of each respective vane in the light-blocking position, and the vanes being spaced from one another such that in the light-blocking position the first longitudinal margin of one vane overlaps the second longitudinal margin of an adjacent vane.

* * * * *